United States Patent
Liu et al.

(10) Patent No.: US 9,786,087 B1
(45) Date of Patent: Oct. 10, 2017

(54) MANAGEMENT OF ANIMATION COLLISIONS

(71) Applicant: Amazon Technologies, Inc., Reno, NV (US)

(72) Inventors: Xiangyu Liu, Revere, MA (US); Andrew Dean Christian, Lincoln, MA (US)

(73) Assignee: Amazon Technologies, Inc., Reno, NV (US)

( * ) Notice: Subject to any disclaimer, the term of this patent is extended or adjusted under 35 U.S.C. 154(b) by 359 days.

(21) Appl. No.: 13/956,917

(22) Filed: Aug. 1, 2013

(51) Int. Cl.
*G06T 11/00* (2006.01)
*G06T 13/80* (2011.01)

(52) U.S. Cl.
CPC .................. *G06T 13/80* (2013.01)

(58) Field of Classification Search
CPC ........ G06F 3/04817; G06F 8/34; G06F 15/16; G05B 2219/31186; G05B 2219/31205; G09G 2310/04; H04N 2005/2255; H04L 29/08846; A63F 13/355; G06T 13/40; G06T 2213/12
USPC ........................................................ 345/474
See application file for complete search history.

(56) References Cited

U.S. PATENT DOCUMENTS

| | | | |
|---|---|---|---|
| 2010/0134501 A1* | 6/2010 | Lowe ...................... | G06T 13/40 345/474 |
| 2011/0225547 A1* | 9/2011 | Fong ....................... | G06T 13/00 715/835 |
| 2014/0288686 A1* | 9/2014 | Sant ........................ | G06F 3/165 700/94 |

* cited by examiner

*Primary Examiner* — Gregory J Tryder
*Assistant Examiner* — Kwang Lee
(74) *Attorney, Agent, or Firm* — Eversheds Sutherland (US) LLP

(57) ABSTRACT

Systems, devices, and techniques are provided for management of animation collisions. An animation that may collide with another animation is represented with a sequence of one or more animation states, wherein each animation state in the sequence is associated with or otherwise corresponds to a portion of the animation. In order to manage animation collisions, a state machine can be configured to include a group of states that comprises animation states from a group of animations that may collide and states that can control implementation of an animation in response to an animation collision. In one aspect, a state machine manager can implement the group of states in order to implement an animation and manage animation collisions.

19 Claims, 12 Drawing Sheets

$A_0$. ADD LIST ITEM = ADD = {I, II, III, IV}

$A_1$. REMOVE LIST ITEM = REMOVE = {V, III, IV}

$A_2$. CLEAR FILTER LIST = CLEAR = {V, IV}

$A_3$. SET MENU = SET = {I, III, IV}

FIG. 3A

| ANIMATION STATES |  |
| --- | --- |
| I. | MENU FADES OUT |
| II. | LIST ITEM IS ANIMATED |
| III. | FILTER LIST MOVES TO POSITION BASED ON MENU |
| IV. | MENU FADES IN |
| V. | MENU FADES OUT<br>FILTER LIST ITEM REMOVED |
| VI. | MENU FADES OUT |
| VII. | MENU FADES IN<br>FILTER LIST FADES IN |
| VIII. | FADE OUT ALL |

FIG. 3B

| CURRENT | Add (A) | Add | Set | Remove | Clear |
|---|---|---|---|---|---|
| Add (A) | | | | | |
| | I | Cancel Current VIII Wait VII | Finish I, II Wait III, IV | Cancel Current VIII Wait VII | Cancel Current VIII Wait VII |
| | II | Cancel Current VIII Wait VII | Finish II Wait III, IV | Cancel Current VIII Wait VII | Cancel Current VIII Wait VII |
| | III | Cancel Current VIII Wait VII | Cancel III Wait III, IV | Cancel Current VIII Wait VII | Cancel Current VIII Wait VII |
| | IV | Cancel Current VIII Wait VII | Cancel IV VI Wait III, IV | Cancel Current VIII Wait VII | Cancel Current VIII Wait VII |
| Remove (R) | | | | | |
| | V | Cancel Current VIII Wait VII | Finish V Wait III, IV | Cancel Current VIII Wait VII | Cancel Current VIII Wait VII |
| | III | Cancel Current VIII Wait VII | Cancel III Wait III, IV | Cancel Current VIII Wait VII | Cancel Current VIII Wait VII |
| | IV | Cancel Current VIII Wait VII | Cancel IV VI Wait III, IV | Cancel Current VIII Wait VII | Cancel Current VIII Wait VII |
| Set (S) | | | | | |
| | I | Cancel Current VIII Wait VII | Finish I Wait III, IV | Cancel Current VIII Wait VII | Cancel Current VIII Wait VII |
| | III | Cancel Current VIII Wait VII | Cancel III Wait III, IV | Cancel Current VIII Wait VII | Cancel Current VIII Wait VII |
| | IV | Cancel Current VIII Wait VII | Cancel IV VI Wait III, IV | Cancel Current VIII Wait VII | Cancel Current VIII Wait VII |
| | VI | Cancel Current VIII Wait VII | Finish VI Wait III, IV | Cancel Current VIII Wait VII | Cancel Current VIII Wait VII |

FIG. 5

MANAGEMENT OF ANIMATION COLLISIONS

BACKGROUND

Certain electronic devices can rely on animations of information in order to permit an end-user to peruse the information and consume at least a part of it. Such animations can be directed to a user interface (UI) element instantiated in a rendering unit associated with an electronic device. In scenarios in which an animation directed to the UI element is initiated prior to when another animation completing implementation at the UI element, such animations collide—e.g., an animation collision occurs—which can cause rendering artifacts at the UI element.

BRIEF DESCRIPTION OF THE DRAWINGS

The accompanying drawings form part of the disclosure and are incorporated into the subject specification. The drawings illustrate example embodiments of the disclosure and, in conjunction with the present description and claims, serve to explain, at least in part, various principles, features, or aspects of the disclosure. Certain embodiments of the disclosure are described more fully below with reference to the accompanying drawings. However, various aspects of the disclosure can be implemented in many different forms and should not be construed as being limited to the implementations set forth herein. Like numbers refer to like elements throughout.

FIG. 2A presents a collisionless scenario and FIG. 2B presents an animation collision (or collision) and schematics of example collision management in accordance with aspects of the disclosure.

FIGS. 3A-3B illustrate example animations and associated animation states, respectively, in accordance with one or more aspects of the disclosure.

FIG. 5 illustrates an example state table representative of an example state machine associated with management of animation collisions in accordance with one or more aspects of the disclosure.

DETAILED DESCRIPTION

Figure 1A:
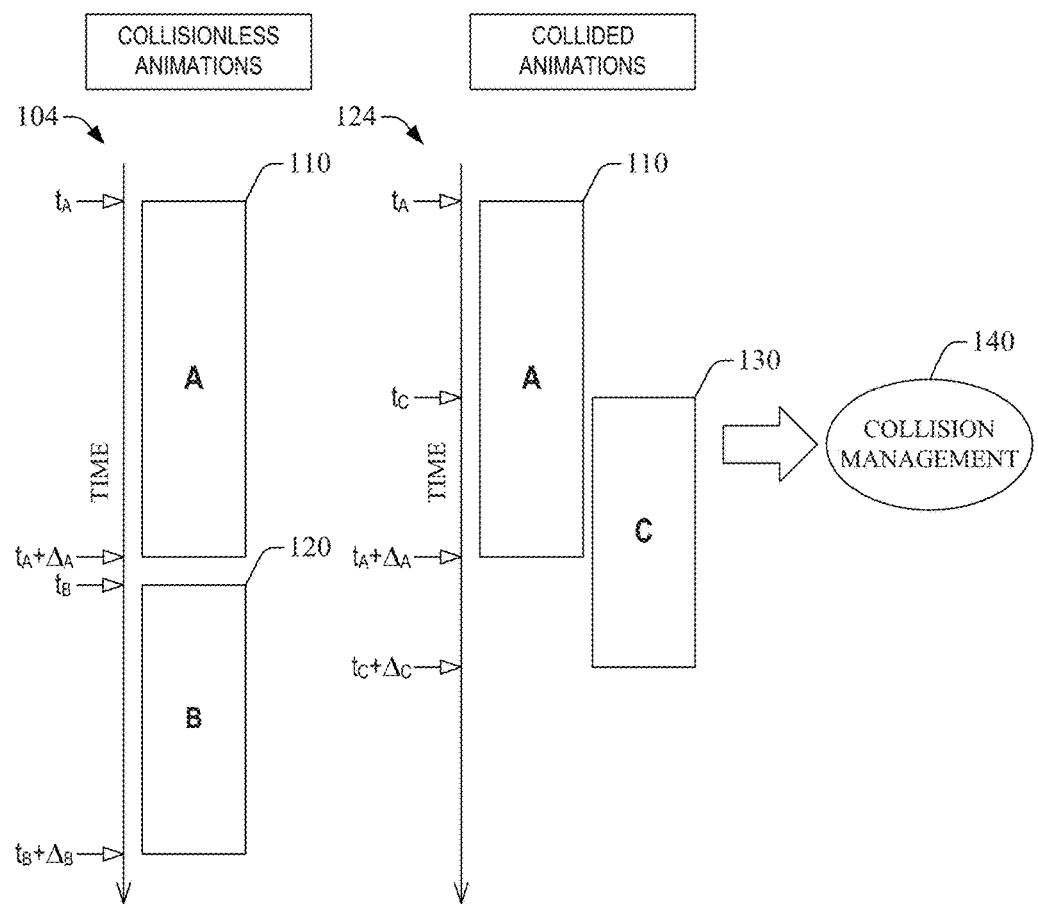
FIGS. 1A-1B and FIGS. 2A-2B depict example animation scenarios in accordance with one or more aspects of the disclosure. Diagrams in FIG. 1A represent both a scenario free of animation collision—referred to herein as collisionless scenarios—and a scenario including an animation collision. Diagrams in FIG. 1B also represent a scenario including an animation collision. Similarly.

The disclosure recognizes and addresses, in at least one aspect, the issue of animation collisions and management thereof in order to mitigate or avoid rendering artifacts that may be caused by such collisions. As described in greater detail below, the disclosure provides various embodiments of systems, devices, and techniques for management of animation collisions—e.g., mitigation of rendering artifacts that may arise from an animation collision and/or resolution of the animation collision. For example, a collision between animations can occur, for example, when a first animation which takes a significant period of time to complete, e.g., two to three seconds, is being rendered in an electronic device, and an end-user recognizes that the content that is being rendered is not the desired content and, in response, the end-user initiates a second animation in the electronic device while the first animation is still being animated. Such collision scenario may be encountered, for example, when the end-user is perusing electronic books in an electronic book reader (an ebook reader). More specifically, yet not exclusively, a menu in the ebook reader may present various categories of electronic books (e.g., action, drama, cooking, etc.) and when an ebook is selected from the menu, the electronic book (ebook) may animate up and then display all the chapters underneath the ebook as part of the list of chapters in the ebook. Further, selection of a chapter can result in the chapter's content being animated up, which can display one or more sections (e.g., a sub-chapter or a paragraph) associated with the chapter. The end-user may realize during the various animations that occur prior to rendering of certain desired content (e.g., a specific recipe in a Mexican cuisine cooking book) that the content that is being rendered is not the desired or otherwise content. In response, the end-user may navigate back to the menu and select a different book while such animations continue to be animated. Yet, selection of a different ebook (e.g., a Brazilian cuisine cooking book) also may include one or more animations, which can cause an animation related to the later selected book to collide with an animation that still is being animated in connection with the initially selected book.

In certain aspects of the disclosure, an animation is configured as a sequence of one or more animation states, where each animation state in the sequence is associated with or otherwise corresponds to a portion of the animation, where the portion of the animation is or comprises a specific animation. Accordingly, in certain embodiments, the animation can be implemented by executing each animation state and its associated portion of the animation sequentially in accordance with the animation sequence. For example, continuing with the foregoing ebook reader scenario, an animation associated with selection of an ebook can be composed to include a sequence of animations associated with rendering content that presents the book (e.g., book's cover), then rendering content that presents a synopsis of the book, and then rendering content that presents a list of chapters of the book (such a list may be generally referred to as a filter list), and so forth. In order to manage animation collisions, a state machine can be implemented (e.g., configured, executed, configured and executed, or the like). The state machine can be configured to include a group of states that comprises (i) animation states from a group of animations that may collide (e.g., various animations that are part of rendering contents of an ebook) and (ii) states that can control implementation of an animation in the group of animations (e.g., an animation that renders a recipe in a cooking ebook) in response to an animation collision. A state machine management platform can be implemented to keep track of a current state, manage state transitions, and execute a state animation at the current state. In scenarios in which two animations collide—e.g., an animation sequence is initiated while another animation sequence is being implemented—the state machine management platform can intelligently control the animation collision by examinating a current state at which the collision occurs with a predetermined animation sequence in order to avoid rendering artifacts, such as undesirable visual effects. While various embodiments of the disclosure are illustrated in the context of animations associated with navigation or perusal of content assets, such as ebooks and collision scenarios related to such animations, it should be recognized that collision between other animations can be managed in accordance with one or more aspects of the disclosure.

In connection with the drawings, FIG. 1A is a block diagram that depicts animation scenarios in accordance with one or more aspects of the disclosure. In the present disclosure, an end-user can interact with user equipment (not shown) in order to initiate an animation towards a UI element. The user equipment can instantiate a UI element at a rendering unit that is integrated into or otherwise functionally coupled to the user equipment. The user equipment can be embodied in or can comprise a computing device having various computing resources, such as one or more processors and one or more memory devices, and various communication resources, such as communication devices (e.g., a system bus, a memory bus, or the like) and/or input/output (I/O) interface(s). In one aspect, the I/O interfaces include a display device having certain screen real state available for rendering of visual information (e.g., textual and/or graphical information). In certain embodiments, the user equipment can be embodied in a wireless computing device (e.g., a mobile computing device, including wearable computing devices) or a tethered computing device. Diagram 104 represents an animation scenario that is free of animation collision, referred to herein as a collisionless scenario. In the depicted collisionless scenario, two animations are directed to a single UI element (e.g., UI element 160 in FIG. 1B) at different instants such that the first of the two animations is implemented (e.g., executed and/or rendered) in its totality prior to the second animation being initiated and implemented. In particular, an animation A 110 is initiated at an instant $t_A$ and is implemented for an interval $\Delta_A$. Subsequent to the instant $t_A+\Delta_A$, an animation B 120 is initiated at an instant $t_B$ and may be implemented for an interval $\Delta_B$, ending at an instant $t_B+\Delta_B$.

In addition, diagram 124 in FIG. 1A depicts an animation scenario in which an animation collision is present: The animation A 110 can be initiated towards a single UI element at instant $t_A$ and prior to being fully implemented, an animation C 130 is initiated at toward the UI element at instant $t_C$ that is earlier than or substantially coincident with $t_A+\Delta_A$. The animation C 130 is intended to be implemented for an interval $\Delta_C$ that elapses after $t_A+\Delta_A$. Accordingly, the animation C 130 can be intended to be, at least in part, substantially concurrent with the animation A 110 and thus the animation C 130 collides into the animation A 110. In one aspect, the animation A 110 (or more generally, a first animation) and the animation C 130 (or more generally, a second animation) can be directed to animation of a first indicia according to respective transformations of information (e.g., visual content). In the present disclosure, the term "indicia" refers to an amount of information or content, such as motion media (motion images and/or audio segments), non-motion media, markings (e.g., graphic markings or textual markings), combinations thereof, or the like. In another aspect, the animation A 110 (or more generally, the first animation) can be directed to animation of the first indicia and the animation C 130 (or more generally, the second animation) can be directed to animation of a second indicia. The animations A and C may be herein referred to as collided animations.

Figure 1B:
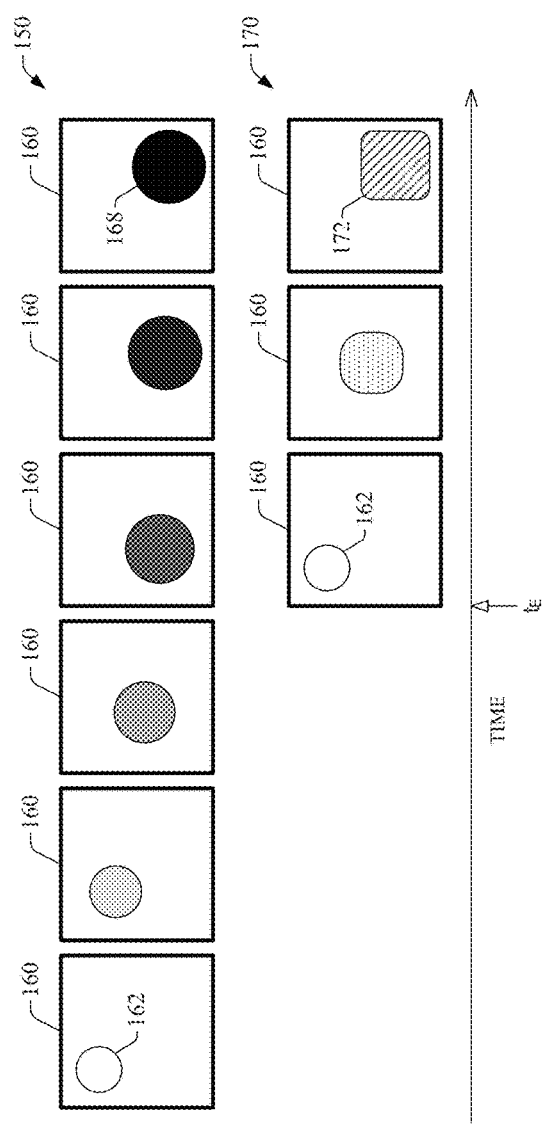

As illustrated in FIG. 1B, two collided animations 150 and 170 can include specific content that collides within certain portion of space associated with a UI element 160. The animation 150, also referred to as animation D 150, may represent transition of an indicia 162 (e.g., a radio button on a displayed navigation interface, such as a webpage or a rendering of a directory tree-structure) into another indicia 168. As exemplified, such a transition can include changes in position, color, and size of the indicia 162 as the animation 150 progresses. At certain instant $t_E$, the animation 170 (also referred to as animation E 170) can be initiated and thus can cause an animation collision with the animation D 150. The animation collision can include content collision, wherein the transition of the indicia 162 into the indicia 168 that is being rendered at the UI element 160 in response to implementation of the animation D 150 collides with the transition of the indicia 162 into indicia 172 that also is directed to the UI element 160. In the latter transition, which includes changes in position, shape, and texture (or fill structure), the indicia 162 transitions into the indicia 172 through renderings that are different from the renderings associated with the transition from the indicia 162 into the indicia 168. At instants subsequent to $t_E$, the animation collision between the animation D 150 and the animation E 170 can be managed in accordance with various aspects described herein.

Figures 2A, 2B:
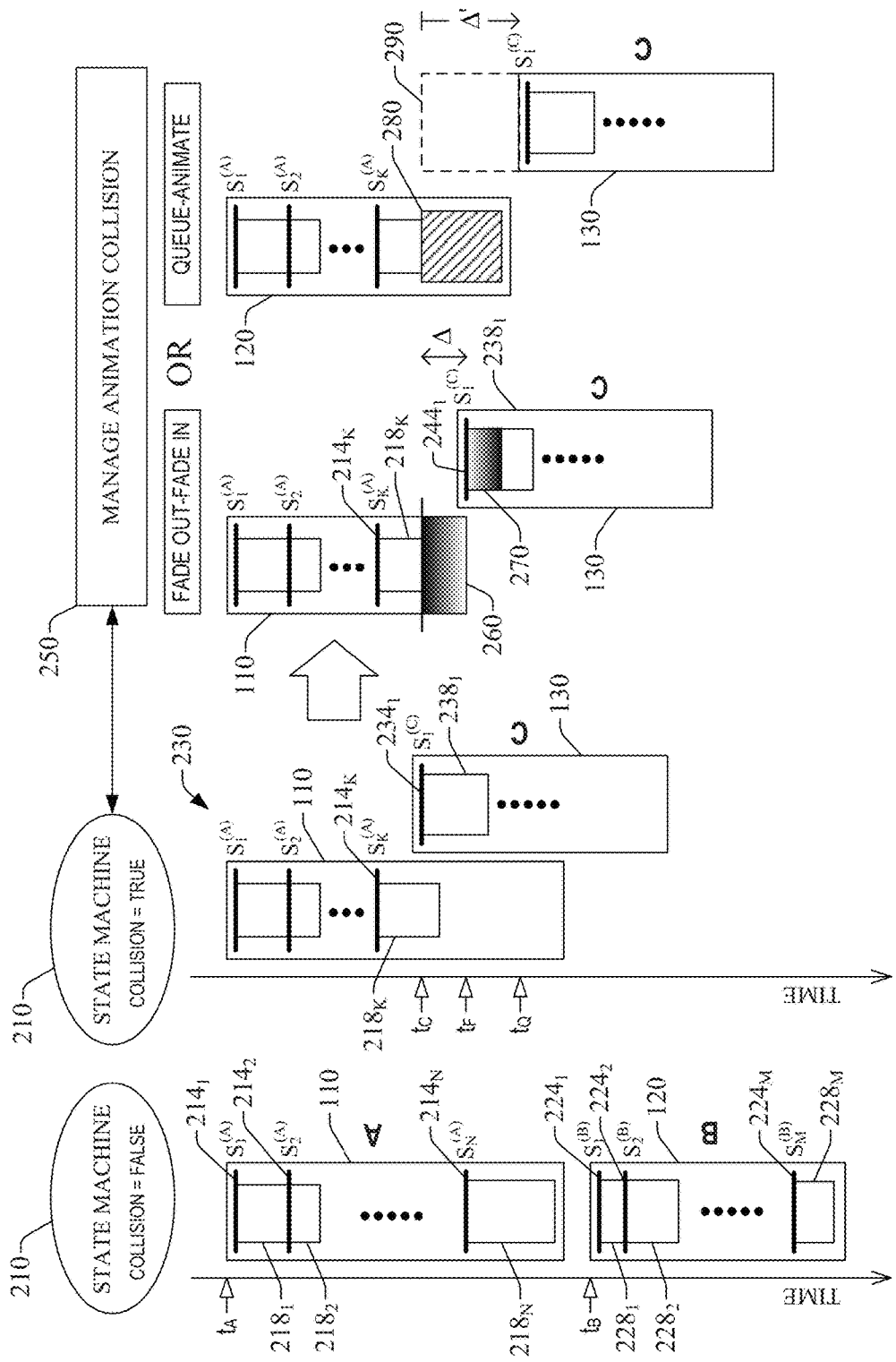

The user equipment that implements the animation A 110 and the animation C 130, and/or the animation D 150 and the animation E 170, can determine that an animation collision is present in connection with the animations A 110 and B 120 and, in response, can manage the animation collision. To at least such an end, the user equipment can implement a collision management block 140. Implementation of the collision management block 140 also can permit management of the animation collision between the animation D 150 and the animation E 170. In certain embodiments, implementation of the collision management block 140 can include implementation of a state machine in order to mitigate or resolve animation collisions. In one aspect, in order to implement the state machine, an animation can be represented as an animation sequence having a group of one or more animation states, wherein each of the one or more animation states (which also may be referred to as states) can be associated with a state animation that corresponds to a portion of the animation. Accordingly, the animation can be composed of a sequence of state animation(s) or portion(s) of the animation and implementation (e.g., execution) of the animation includes implementation (e.g., execution) of at least one (e.g., one, two, more than two, or each) of the state animation(s) or portion(s) of the animation in the animation sequence. In one embodiment, the user equipment can implement (e.g., execute) the animation sequence. As an illustration, FIG. 2A depicts the collisionless scenario presented in diagram 104, conveying a representation of a respective sequence of animation states for the animation A 110 and the animation B 120. As illustrated, the animation A 110 includes a sequence of N animation states $S_1^{(A)}$ $214_1$, $S_2^{(A)}$ $214_2$, . . . , and $S_N^{(A)}$ $214_N$, with N a natural number satisfying N≥1, wherein each of such animation states is associated with a state animation $218_\lambda$, with $\lambda=1, 2, \ldots N$. As shown, each of the animation(s) $218_\lambda$, is configured to span a specific time interval—a feature that is illustrated with rectangles of different heights in FIG. 2A. Each of such state animations may be referred to as a portion of the animation A 110, the portion corresponding to or otherwise being associated with an animation state $S_\lambda^{(A)}$. The animation B 120 includes a sequence of M animation states $S_1^{(B)}$ $224_1$, $S_2^{(B)}$ $224_2$, . . . , and $S_M^{(B)}$ $224_M$, with M a natural number satisfying M≥1, wherein each of such animation states is associated with a state animation $228_\kappa$, with κ=1, 2, . . . M. Each of such state animations may be referred to as a portion of the animation B 120, the portion corresponding to or otherwise being associated with an animation state $S_\kappa^{(A)}$. Similar to state animation(s) in animation A 110, each of the state animation(s) $228_\kappa$ is configured to span a specific time interval. Similarly, diagram 230 in FIG. 2B depicts the collision scenario shown in diagram 124, conveying one animation state $S_1^{(A)}$ of the animation sequence associated with the animation C 130, and a state animation $238_1$. It should be appreciated that, in one aspect, the animation C 130 can include a sequence of Q animation states $S_1^{(C)}$ $234_1$, $S_2^{(C)}$ $234_2$, . . . , and $S_Q^{(C)}$ $234_Q$, with Q a natural number satisfying Q≥1, wherein each of such animation states is associated with a state animation $238_\gamma$, with γ=1, 2, . . . Q. In addition, each of the state animations $238_\gamma$ may be referred to as a portion of the animation C 130, such portion corresponding to or otherwise being associated with an animation state $S_\gamma^{(A)}$. It should be noted that animation states and associated state animations are not depicted for γ>1 in diagram 230.

In a specific example in accordance with certain aspect of the disclosure, FIG. 3A conveys example animations and related animation sequences in the context of animations associated with navigation or perusal of content assets. The animations illustrated in FIG. 3A are defined in terms of at least some of the example animation states and associated state animations conveyed in FIG. 3B. As illustrated, a first example animation $A_0$ may be directed to the addition of a list item to a category list and includes a sequence of four states: I, II, III, and IV. In the present disclosure, the example animation $A_0$ may be referred to as an "add" animation. In an example scenario in which animation A 110 embodies animation $A_0$, N=4 and $S_1^{(A)}$=I, $S_2^{(A)}$=II, $S_3^{(A)}$=III, and $S_4^{(A)}$=IV. A second example animation $A_1$ may be directed to the removal of a list item in the category list and can include a sequence of three states: V, III, and IV. The example animation $A_1$ may be referred to as a "remove" animation. In an example scenario in which animation C 130 embodies animation $A_1$, N=3 and $S_1^{(C)}$=V, $S_2^{(C)}$=III, and $S_3^{(C)}$=IV. A third example animation $A_2$ may be directed to the clearance of a category list (also referred to as a filter list) and can include a sequence of two states: V and IV. The example animation $A_2$ may be referred to as a "clear" animation. In an example scenario in which animation C 130 embodies animation $A_2$, Q=2 and $S_1^{(C)}$=V, and $S_3^{(C)}$=IV. A fourth example animation $A_3$ may be directed to the presentation or rendering of a menu of categories or category lists, and can include a sequence of three states: I, III, and IV. The example animation $A_3$ may be referred to as a "set" animation. In an example scenario in which the animation C 130 embodies animation $A_3$, Q=3 and $S_1^{(C)}$=V, $S_2^{(C)}$=III, and $S_3^{(C)}$=IV. As illustrated in example state VII, a state animation in accordance with one aspect of the disclosure may be a composite animation. The state animation associated with state VII includes two individual animations: (a) menu fades in and (b) filter list fades in.

Figure 4A:
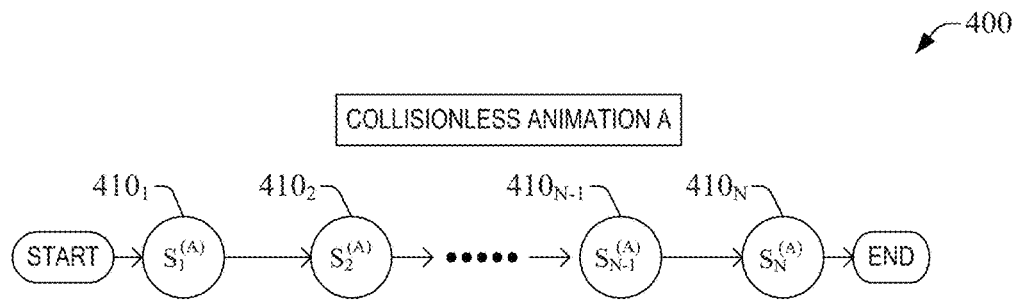
FIGS. 4A-4C illustrate example state diagrams in accordance with one or more aspects of the disclosure.

As described herein, an animation may be collisionless or may collide with another animation. A state machine in accordance with an aspect of the disclosure can be configured in order to account for both collisionless implementation of an animation and management of an animation collision associated with the animation. To at least such an end, in another aspect of implementation of the state machine, the state machine can be configured to include a group of states comprising at least the animation states associated with the animation sequences pertaining to the animation. Such a state machine is illustrated as state machine 210 in FIGS. 2A-2B. In addition, a group of one or more transition conditions and information representative of respective transitions can be configured in order to define condition(s) that can cause a transition between two states of the group of states, and to specify one or more actions associated with a transition pertinent to a transition condition. A transition condition and/or a related transition can be determined at least in part by a current state of the two states. In certain implementations, an intra-state state machine—e.g., an auxiliary state machine associated with a current state of a state machine—can permit implementation of one or more actions that permit evaluation of the transition condition and/or the related transition. As an illustration of a state machine in accordance with one or more aspects of the disclosure, FIG. 4A presents an example state diagram 400 indicative of an example state machine that permits implementing the animation A 110 in a collisionless scenario. In such a diagram, each state of the sequence of N animation states $S_1^{(A)}$ $214_1$, $S_2^{(A)}$ $214_2$, . . . , and $S_N^{(A)}$ $214_N$ is represented as a node $410_\lambda$ in a directed graph having N−1 edges (represented with solid, open arrows) that represent transitions between nearest-neighbor states. Each state animation associated with a respective node $410_\lambda$, is executed sequentially, which results in the collisionless implementation of the animation A 110.

In connection with the animation scenario depicted in diagram 230 in FIG. 2B in which the animation C 130 and the animation A 110 collide—the animation C 130 is initiated by initiating the state animation $238_1$ (or a first portion of the animation C 130) associated with the animation state $234_1$ at time $t_c$ prior to termination of implementation of the state animation $214_K$—such an animation collision can be managed in accordance with at least two example approaches. In certain implementations of one of the two example approaches, which may be referred to as a fade-out-fade-in approach, the state animation $218_K$ (which is a portion of the animation A 110) can be interrupted or otherwise terminated, and a rendering of content associated with the interrupted or otherwise terminated state animation can be faded out over a predetermined period $\Delta = t_F - t_C$ (which may be referred to as the fade-out period). In certain embodiments, the magnitude of A can be determined based at least on the animation that is faded out, and can be at most of the order of one second, with magnitudes of A ranging, in certain embodiments, from about 50 milliseconds (ms) to about 500 ms. In one aspect, during such a period, the intensity of the rendering of content can be diminished from an initial intensity consistent with such a rendering to an intensity that is substantially non-visible or otherwise non-perceivable by an end-user of the user equipment (e.g., a computing device) in which the fading-out rendering is conveyed. In other implementations of the fade-out-fade-in approach, the state animation $218_K$ can be interrupted or completed, and subsequent animation states of the animation A 110 can be implemented at progressively lower rendering intensities (e.g., lower brightness and/or lower opacity; see also FIG. 4B). It should be appreciated that in such implementations, the animation A 110 is not terminated, but rather it is implemented in a manner that rendering of the animation is progressively less visible or otherwise perceptible by an end-user of a computing device that renders the animation A 110. In yet other implementations of the fade-out-fade-in approach, the fade-out-fade-in of rendering intensities can be generalized as described herein. A generalized scalar or vector weight associated with a parametric property of the animation 110, e.g., position, orientation or rotation with respect to a predetermined axis, color (such as red-green-blue (RGB) color model composition), brightness, opacity or transparency, reflectance, font selection, indicia thickness, and the like, can be utilized or otherwise leverage to perform a weighted combination of two animations that collide (e.g., animation A 110 and animation C 130). The weighted combination (e.g., an arithmetic average) can permit the first animation to become progressively or abruptly non-perceptible (e.g., non-visible) to an end-user of user equipment that render the first animation, and can permit the second animation to become progressively or abruptly perceptible to the end-user. In still other implementations of the fade-out-fade-in approach, implementation of weighted combinations can be generalized as described herein. A set of one or more parameters (scalar parameters and/or vector parameters) associated with one or more parametric properties of the first animation can be varied from post-collision animation state to post-collision animation state according to a predetermined selection or rule in order to transform the first animation from perceptible to non-perceptible. Substantially concurrently with or in a time-shifted fashion with respect to implementation of post-collision state of the first animation, a set of parameters associated with one or more parametric properties of the second animation can be varied across the animation states of the second animation in order to transform the first animation from non-perceptible to perceptible. Such variations of parameters (scalar parameters or vector parameters) associated with parametric properties can be referred to herein as "parameter adaptation." General implementations of the fade-out-fade-in approach that include parametric adaptation may be referred to as "parametric fade-out-fade-in."

Figure 4B:
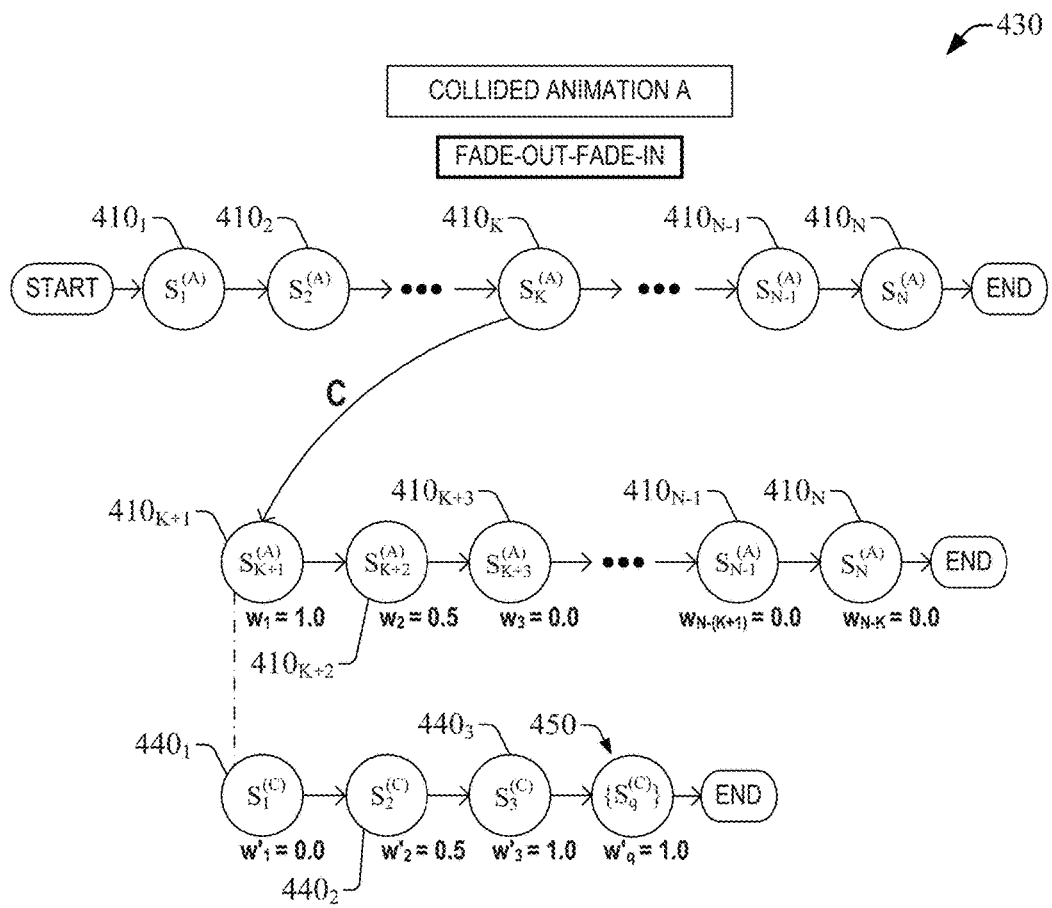

In FIG. 2B, the fading-out described herein is represented with a block 260 having a grey-scale gradient. In addition, in the fade-out-fade-in approach, implementation of the state animation $238_1$ is delayed until completion or substantial completion of the fade-out period Δ. In response to (e.g., upon or after) the fade-out period elapsing, the state animation $238_1$ (or the first portion of the animation C 130) is implemented, with the intensity of a rendering of content associated with such state animation being faded in during a predetermined fade-in period. In FIG. 2B, such fading is represented with a block 260 having a grey-scale gradient. In certain embodiments, the magnitude of the fade-in period can be determined based at least on the animation that is faded in and, can be of the order of one second, with magnitudes of such a period ranging, in certain embodiments, from about 50 milliseconds (ms) to about 500 ms. As illustrated in FIG. 3B, it should be appreciated that the described rendering fade-out and rendering fade-in can be cast as respective state animations associated with respective animation states, such as states VIII and VII described herein. Such animation states can be incorporated into the state machine 210 in order to manage an animation collision in accordance with the described fade-out-fade-in approach. As an example, FIG. 4B illustrates an example state diagram 430 representative of the fade-out-fade-in approach in which a collision between a first animation, illustrated with animation A 110, and a second animation, illustrated with animation C 130, is managed in accordance with at least certain aspects of the disclosure. In the example state diagram 430, animation C 130 collides with animation A 110 during implementation of state $S_K^{(A)}$, represented with node $410_K$. As described herein, such a collision can be caused by a function call that initiates the animation C 130. In such scenario, as part of management of the collision, the state $S_K^{(A)}$ is caused to transition to the state $S_{K+1}^{(A)}$, represented with node $410_{K+1}$. In addition, rendering of the animation associated with the state $S_{K+1}^{(A)}$ is supplied with a weighted rendering intensity (e.g., brightness and/or opacity setting) which is set to a normalized value of $w_1=1.0$. Such a value may be set to 1.0 in order to indicate normal rendering of the animation associated with the state $S_{K+1}^{(A)}$. Completion of implementation of the state $S_{K+1}^{(A)}$ results in a transition to state $S_{K+1}^{(A)}$ represented with node $410_{K+2}$. As part of the fade-out-fade-in approach, in one aspect, the animation associated with the state $S_{K+1}^{(A)}$ also is rendered with a weighted intensity, which may be set, for example, to a value $w_2=0.5$. It should be appreciated that, in one aspect, the animation associated with the state $S_{K+1}^{(A)}$ is a portion of the animation A 110. Such reduction of the rendering intensity produces, in one aspect, a progressive fade-out of the animation A 110. Completion of the implementation of the state $S_{K+2}^{(A)}$ results in a transition to state $S_{K+3}^{(A)}$, represented with node $410_{K+3}$. As illustrated, the animation associated with the state $S_{K+3}^{(A)}$ is rendered at a null rendering intensity of $w_3=0.0$. It also should be appreciated that, in one aspect, the animation associated with the state $S_{K+3}^{(A)}$ is a portion of the animation A 110. Thus, even though the state $S_{K+3}^{(A)}$ is implemented, the animation associated with such a state is non-visible when rendered in a rendering unit the conveys the animation A 110. As further illustrated, remaining states $S_{K+4}^{(A)}, \ldots, S_{N-1}^{(A)}$ and $S_N^{(A)}$ of the animation A 110 are implemented, respectively, at null rendering intensities $w_4=0.0, \ldots, w_{N-(K+1)}=0.0$, and $w_{N-K}=0.0$.

In the illustrated fade-out-fade-in approach, the animation C 130 also is implemented, either substantially concurrently with or delayed from implementation of the states $S_{K+1}^{(A)}$, $S_{K+2}^{(A)}, S_{K+3}^{(A)}, \ldots, S_{N-1}^{(A)}, S_N^{(A)}$ having respective weighted rendering intensities $\{w_1, w_2, w_3, \ldots, w_{N-(K+1)}, w_{N-K}\}$ satisfying the following relationship: $w_1 > w_2 > w_3, \ldots, w_{N-(K+1)} > w_{N-K}$, which represents a progressive fade out of the animation A 110. Such states may be referred to as weighted states. In the illustrated scenario, states $\{S_{K+1}^{(A)}, S_{K+2}^{(A)}, S_{K+3}^{(A)}, \ldots S_{N-1}^{(A)}, S_N^{(A)}\}$ are implemented with respective weighted rendering intensities $\{w'_1, w'_2, w'_3, \ldots w'_{Q-1}, w'_Q\}$ satisfying the following relationship: $w'_1 < w'_2 < w'_3, \ldots, w'_{Q-1} < w'_Q$, which represents a progressive fade out of the animation A 110. In the scenario illustrated in FIG. 4B, $w'_1=0.0, w'_2=0.5, w'_3=1.0, w'_q=1.0$, with $4 \leq q \leq Q$. In the present disclosure, in one aspect, a weight indicative of a rendering intensity is a real number w satisfying the following relationship $0 \leq w \leq 1$. Accordingly, in an implementation in which the animation C 110 is initiated and implemented substantially concurrently with the post-collision portion of the animation A 110—e.g., states $S_{K+1}^{(A)}, S_{K+2}^{(A)}, S_{K+3}^{(A)}, \ldots, S_{N-1}^{(A)}, S_N^{(A)}$—during fade-out-fade-in, a rendering device can present an animation that conveys a weighted combination of content from the animation A 110 and animation C 130. Stated alternatively, during fade-out-fade-in, the rendering device can convey weighted content originating from animation states associated with colliding animations that are implemented, at least in part, substantially concurrently.

Figure 4C:
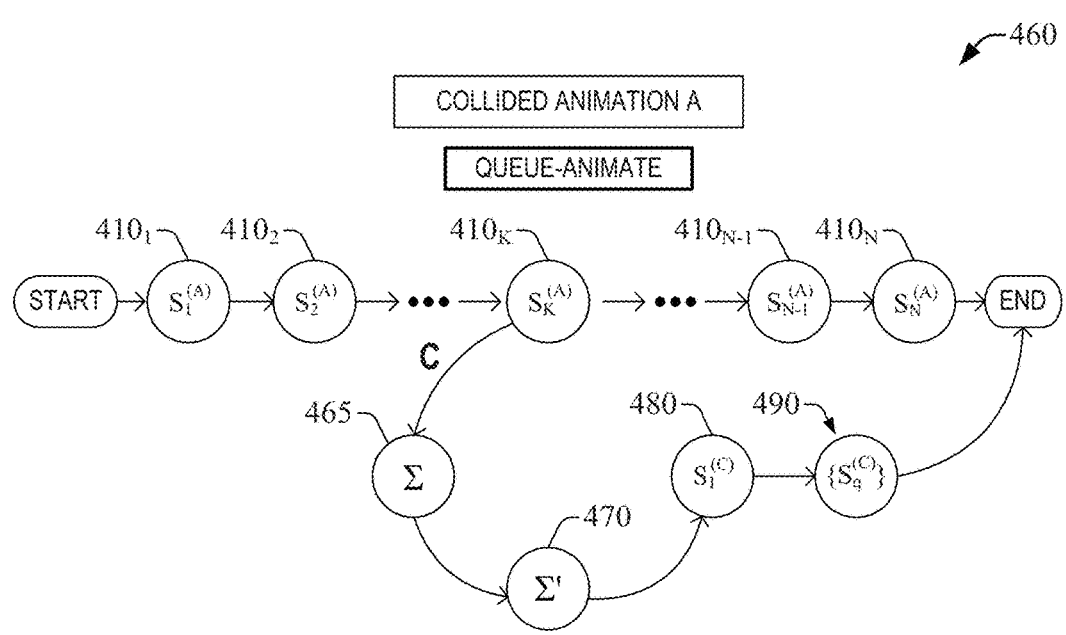

As described herein, fade-out-fade-in is not limited to rendering content associated with concurrent collided animations having weighted rendering intensities. More generally, a generalized weight $W^{(\alpha)}$ associated with a parametric property of an animation, e.g., position, orientation or rotation with respect to a predetermined axis, color (such as red-green-blue (RGB) color model composition), brightness, opacity or transparency, reflectance, font selection, indicia thickness, and the like, can be utilized or otherwise leverage to perform a weighted combination of a first animation, e.g., animation A 110, and a second animation, e.g., animation C 130, that collided. Such combination can be state specific, as illustrated in FIG. 4C, and can permit a series of combinations that progressively remove from a rendering certain values of parametric property(ies) from the first animation and incorporate into the rendering other values of such property(ies). Accordingly, in the fade-out-fade-in approach, a scalar or vector weight $W^{(\alpha)}$ of a parametric property of a first animation is removed or otherwise reduced (progressively or otherwise) while other scalar or vector weight of the parametric property of a second animation is added or otherwise increased (progressively or otherwise).

In the other of the two example approaches to management of the animation collision pictorialized in diagram 230, the animation C 130 can be queued for a period $\Delta'=t_Q-t_C$ in order to permit implementation of one or more actions associated with or otherwise related to the state animation $218_K$ (which is a portion of the animation A 110). Such an implementation is depicted with a hatched block 280. Similar to the fade-out-fade-in approach, within the state machine 210, the one or more actions can be represented as one or more transitions and/or one or more states. As an illustration, FIG. 4C presents an example state diagram 460 indicative of an example embodiment of the state machine 210 in which two states, represented with nodes $\Sigma$ 465 and $\Sigma'$ 470, are added to the sequence of nodes 410₂, associated with animation states $S_1^{(A)}$ 214₁, $S_2^{(A)}$ 214₂, ..., and $S_N^{(A)}$ 214ₙ. In the illustrated example embodiment, initiation of the animation C 130 embodies the input (labeled with a letter "C") that causes a transition from the state $S_K^{(A)}$, represented with node 410ₖ, to the state $\Sigma$. Such an input can be embodied in or can comprise information indicative of initiation of the animation C 130. In certain embodiments, at least a portion of such information can include a function call that initiates the animation C 130 toward a UI element instantiated for rendering in a rendering unit (e.g., a touchscreen display) that conveys the animation A 110. As illustrated in the diagram 460, implementation of the state $\Sigma$ (e.g., execution of an animation associated with the state $\Sigma$) can permit transitioning to state $\Sigma'$, which as described herein, it is represented with the node 470. In addition, in the illustrated example embodiment, implementation of the state E' can result in transition to the first animation state $S_1^{(C)}$ and subsequent transitions to and execution of animation states $S_2^{(C)}$, ..., and $S_Q^{(C)}$, which are collectively represented in FIG. 4C as a single generalized node 490 representing a set of animation states $\{S_q^{(C)}\}$, with q=2, 3, ... Q, and associated nodes (not shown) and transition(s) (not shown). It should be appreciated that in embodiments in which the animation C 130 includes a single animation state $S_1^{(C)}$, the state diagram 490 would not include the generalized node 490. From the illustrated queue-animate scenario represented by the state diagram 460, it should be recognized that implementation of the animation C 130, which causes the collision, is queued in order to permit, at least in part, management of the collision via implementation of the states $\Sigma$ and $\Sigma'$, for example, which may be referred to as "control states." Subsequent to the implementation of such control states, the animation C 130 is implemented. It should be appreciated that in certain embodiments, fewer than two or more than two control states can be utilized or otherwise relied upon in order to manage an animation collision.

In scenarios in which the state machine 210 includes the states $\Sigma$ 460 and $\Sigma'$ 470, execution of such states can permit controlling the implementation of the animation A 110 in response to collision thereof with another animation, such as animation C 130. Such control can permit resolution of the animation collision in that an animation that collides with another animation may proceed in specific manner without producing undesirable rendering effects. It should be recognized that in certain embodiments, the state machine 210 can include other state(s) indicative or otherwise representative of action(s) that permit managing implementation of the animation A 110. It should further be recognized that the one or more states that are implemented in response to an animation collision may be specific to the current state of the animation A 110 at the time of the animation collision and to the animation that collides into the animation A 110.

It should be appreciated that the complexity (e.g., specific states, transition conditions, and/or transitions) of the state machine 210 can be based at least in part on the two or more animation that may collide. For instance, such a complexity can be based at least in part on relative priority of the animations that collided, e.g., a collided animation that is rendering higher priority content may be managed differently from another collided animation that is rendering lower priority content. Similarly, the complexity of the state machine 210 can be based on relative hierarchy of content that is being rendering in a collided animation with respect to the content that is to be rendered in the animation that causes the animation collision. In certain scenarios, an animation that causes a collision may have a low likelihood of occurrence and thus, in one aspect, straightforward management (e.g., fade-out-fade-in) of the collision may be implemented. As an illustration, FIG. 5 presents an example state transition table 500 associated with an example state machine that permits management of animation collisions within the context of perusal of content assets (e.g., ebooks). As illustrated, animations Add (A), Remove (R), Set (S), and the fade-out animation associated with state VI may collide at different animation sequence states with other Add, Set, Remove, or Clear animations. The example state transition table 500 conveys that a collision of a first Add animation (e.g., current Add) with a second Add animation can be managed by cancelling the current state of the first Add animation, transitioning to fade-out state VIII (see FIG. 3B), transitioning to a "wait" state in response to implementation of the fade-out state VIII, and transitioning to fade-in state VII subsequent to a waiting period (e.g., about 1 second to about 3 seconds) associated with the "wait" state. Accordingly, it should be appreciated that management of such a collision may be accomplished via a fade-out-fade-in approach. In addition, as shown in state transition table 500, a similar fade-out-fade-in approach may be implemented to manage collisions between Remove and Set, a first Set animation and a second Set animation; Add and Remove, a first Remove animation and a second Remove animation; and Set and Remove; and any of Add, Remove, or Set and the Clear animation.

It should be appreciated that, in one aspect, implementation of the "wait" state can permit a computer-implemented process to implement certain functionality and/or generate or collect information (e.g., data, metadata, and/or signaling) prior to further implementation of the state machine associated with the example state transition table 500. The process may be executed (concurrently or non-concurrently) in the computation platform that implements the state machine and, in certain embodiments, it may be a process associated with implementation of the state machine.

Accordingly, the duration (or wait period) of the "wait" state may be determined or otherwise based at least in part on computational resources available to such a computation platform. In certain embodiments, such a duration may be of the order of a second (e.g., 1 second, 2 seconds, 3 seconds, 4 seconds, 5 seconds, 6 seconds, 7 seconds, or 8 seconds).

Figure 6:
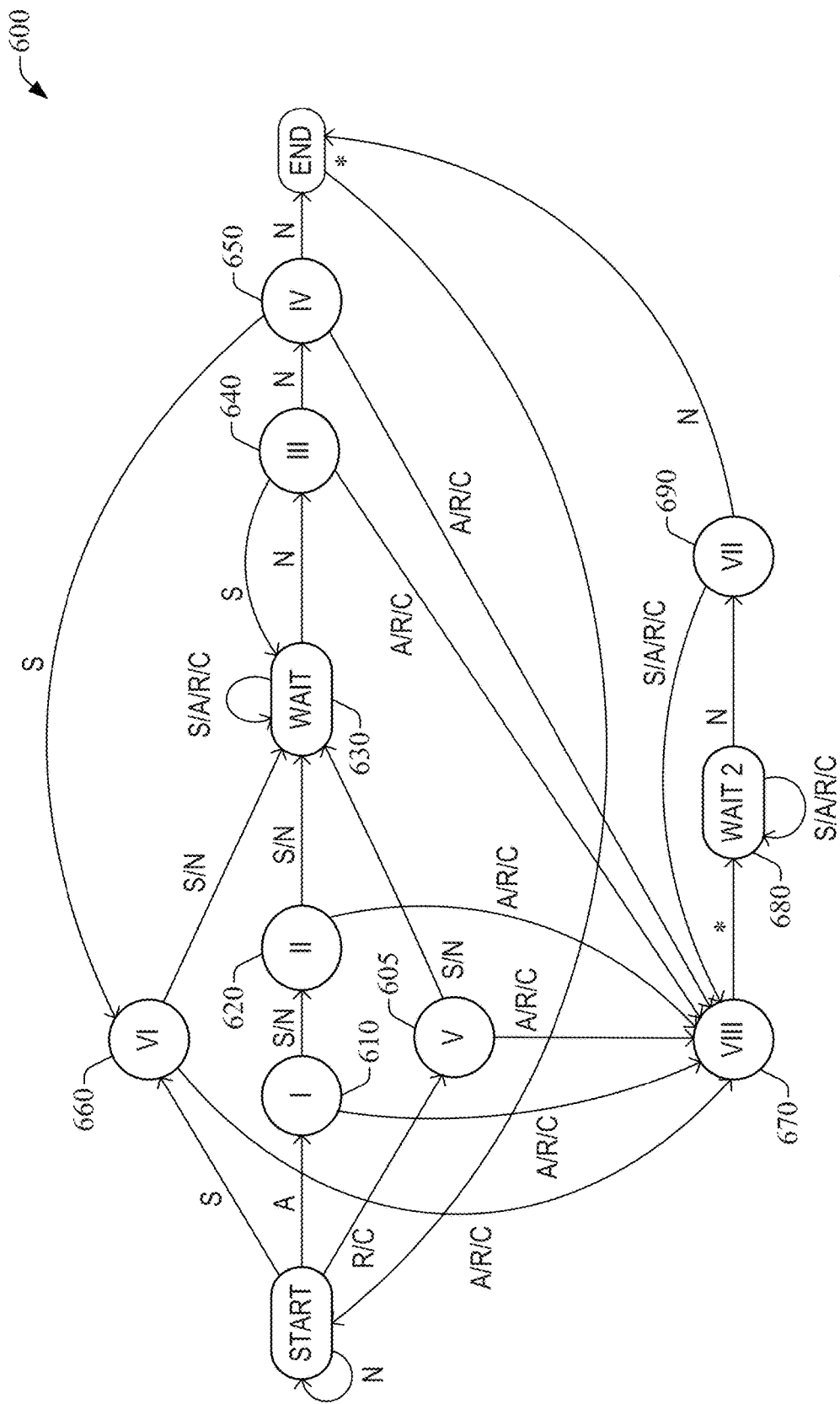
FIG. 6 illustrates an example state diagram representative of an example state machine associated with management of animation collisions in accordance with one or more aspects of the disclosure.

In addition, FIG. 6 presents an example state diagram 600 associated with the state machine represented in the state transition table 500. It is to be appreciated that in the state diagram 600, a collision is represented with an edge outgoing from a node representative of a current state at which the collision occurred. In addition, as described herein, the state machine represented by the state diagram 600 also permit implementation of collisionless animations. For example, the Add animation may be implemented through a series of transitions from the "start" state to node 610 representative of state I; to node 620 representative of state II; to node 630 representative of a "wait" state; to node 640 representative of state III; to node 650 representative of state IV, and to the "end" state. Similarly, the Set animation may be implemented by a series of transitions from the "start" state to node 660 representative of state VI; to node 630 representative of a "wait" state; to node 640 representative of state III; to node 650 representative of state IV, and to the "end" state. Moreover, the Remove animation may be implemented by a series of transitions from the "start" state to node 605 representative of state V; to node 630 representative of a "wait" state; to node 640 representative of state III; to node 650 representative of state IV, and to the "end" state. In the foregoing series, the state associated with each node is executed (e.g., an animation is executed).

Management of a collision between Add and Set can be based on the animation state at which the Add animation collides with the Set animation. For example, in a scenario in which the Add animation is in state I and collides with the Set animation, such a collision can be managed by completing implementation of the states I and II; namely, permitting fading out of a current menu, and completing animation of a list item (see FIG. 3B). Subsequent to completion of the state II, transition to and implementation of a "wait" state occurs. As shown in FIG. 6, such actions are represented by a transition from node 610 to node 620 in response to normal termination of implementation (represented with a letter "N") of the node 610. Then, transition from the node 620 to a "wait" state, represented with node 630, in response to normal termination of implementation of the node 620. In addition, subsequent to implementation of the "wait" (represented by node 630), a transition to node 640 and implementation thereof occurs. Normal termination of the state III associated with the node 640 results in a transition to state IV (represented with node 650) and implementation thereof. Normal termination of implementation of the state IV results in transition to the "end" state.

For another example, in a scenario in which the Add animation is in state II and collides with the Set animation, such a collision can be managed by completing implementation of the state II; namely, permitting and completing animation of a list item (see FIG. 3B). Subsequent to completion of the state II, transition to and implementation of a "wait" state occurs. As shown in FIG. 6, such actions are represented by a transition from node 620 to node 630 due to collision with the Set animation. In addition, subsequent to implementation of the "wait" (represented by node 630), a transition to node 640 and implementation thereof occurs. Normal termination (represented with a letter "N") of the state III associated with the node 640 results in a transition to state IV (represented with node1 650) and implementation thereof. Normal termination of implementation of the state IV results in transition to the "end" state.

For yet another example, in a scenario in which the Add animation is in state III and collides with the Set animation, such a collision can be managed by first cancelling or otherwise terminating state III; namely, terminating motion of a filter list to a predetermined position based on an associated menu (see FIG. 3B). Subsequent to cancellation or termination of state III, transition to and implementation of a "wait" state occurs. As shown in FIG. 6, such actions are represented by a transition from node 640 to node 630 due to collision with the Set (S) animation. In addition, subsequent to implementation of the "wait" state, a transition to node 640 and implementation thereof occurs. Normal termination of the state III associated with the node 640 results in a transition to state IV (represented with node1 650) and implementation thereof. Normal termination of implementation of state IV results in transition to the "end" state.

For still another example, in a scenario in which the Add animation is in state IV and collides with the Set animation, such a collision can be managed by first cancelling or otherwise terminating state IV; namely, cancelling the menu fade-in animation associated with the animation state IV (see FIG. 3B). Subsequent to cancellation or termination of state IV, transition to and implementation of state VI can be effected. As shown in FIG. 6, such actions are represented by a transition from node 650 to node 660. In addition, subsequent to implementation of state IV (represented with the node 660), a transition to a "wait" state is effected—e.g., transition from node 660 to node 630 in response to implementation of state VI with normal termination. Further, implementation of the "wait" state leads to transition to and implementation of state III (represented in FIG. 6 with a transition from node 630 to node 640).

Other collisions that involve the state IV (such as collisions between Remove and Set, when Remove is in state IV, and a Set animation and another Set animation, when the first animation is in state IV) also can be managed in a similar fashion. Namely, one such other collision may be managed by cancelling state IV, implementing state VI, implementing a "wait" state in response to normal termination of the state VI, and implementing states III and IV in sequence upon or after respective normal termination thereof.

As illustrated in FIG. 6, it should be appreciated that any interruption of implementation of the "wait" state represented with node 630 due to initiation of a Set, Add, Remove, or Clear animation does not interrupt implementation of the "wait" state. Such a lack of interruption is illustrated with a self-pointed arrow emanating from and terminating at the node 630. In addition, it should be appreciated that initiation of a Set, Add, Remove, or Clear animation while implementation of the "wait" state is one example of a collision during management of an another prior collision. Other example collisions during management of a prior collision also are illustrated in FIG. 6. For instance, in response to a collision between a Set animation at state IV of an Add animation, the state VI can be implemented. During implementation of state IV, represented by node 660, another collision with an Add, Remove, or Clear animation may occur (e.g., the Add, Remove, or Clear animation can be initiated during implementation of the state VI). In response to such another collision, as illustrated in FIG. 5, a transition from node 660 to node 670 representative of state VIII (see FIG. 3B) can occur and, in response to implementation of the state VIII a transition to a "wait" state, represented with a node 680, can be effected.

In response to normal termination of such a "wait" state, a transition to state VI, represented by node 690, can be effected. Normal termination of implementation of the state VII results in transition to the "end" state. Further, as illustrated in FIG. 6 with an edge labeled 'S/A/R/C," an additional collision with a Set, Add, Remove, or Clear animation may occur during implementation of the state VII. In response to such an additional collision, a transition to the node 670 can be effected and, as a result, state 670 can be implemented, continuing to implementation of the "wait" state represented by the node 680 and then state VI represented by the node 690 upon or after respective normal termination of each of such states. It is to be noted that in FIG. 6, the "*" represents a set comprising animations Set, Add, Remove, and Clear, and normal terminations; namely, the "*" represents a simplification of "S/A/R/C/N."

It should be appreciated that the actions (e.g., evaluation of transition conditions, transition to certain states and implementation thereof) performed in response to collision of the Set animation with another animation, e.g., Add, Remove, or Set, can based at least in part on the current state of such another animation. As described herein, such dependency may be based at least on priority and/or hierarchy of the current state. For instance, as shown in FIG. 5, collision of the Set animation at state I or state II of an Add animation can result in queuing of the Set animation and completion of either state I or state II, or both. In the alternative, collision of the Set animation with states III or state IV of the Add animation result in cancellation of such states. With respect to collisions between Set and Remove, collision of the Set animation at state V of the Remove animation results in completion of the state V prior to implementation of other actions, whereas collision of the Set animation at states III and IV of the Remove animation result in cancellation of such states amongst other actions. Similarly, in connection with collisions between Set and another Set animation, collision of the first Set animation at state I of the second Set animation results in completion of the state I prior to implementation of other actions, whereas collision of the first Set animation at states III and IV of the second Set animation result in cancellation of such states amongst other actions.

Figure 7:
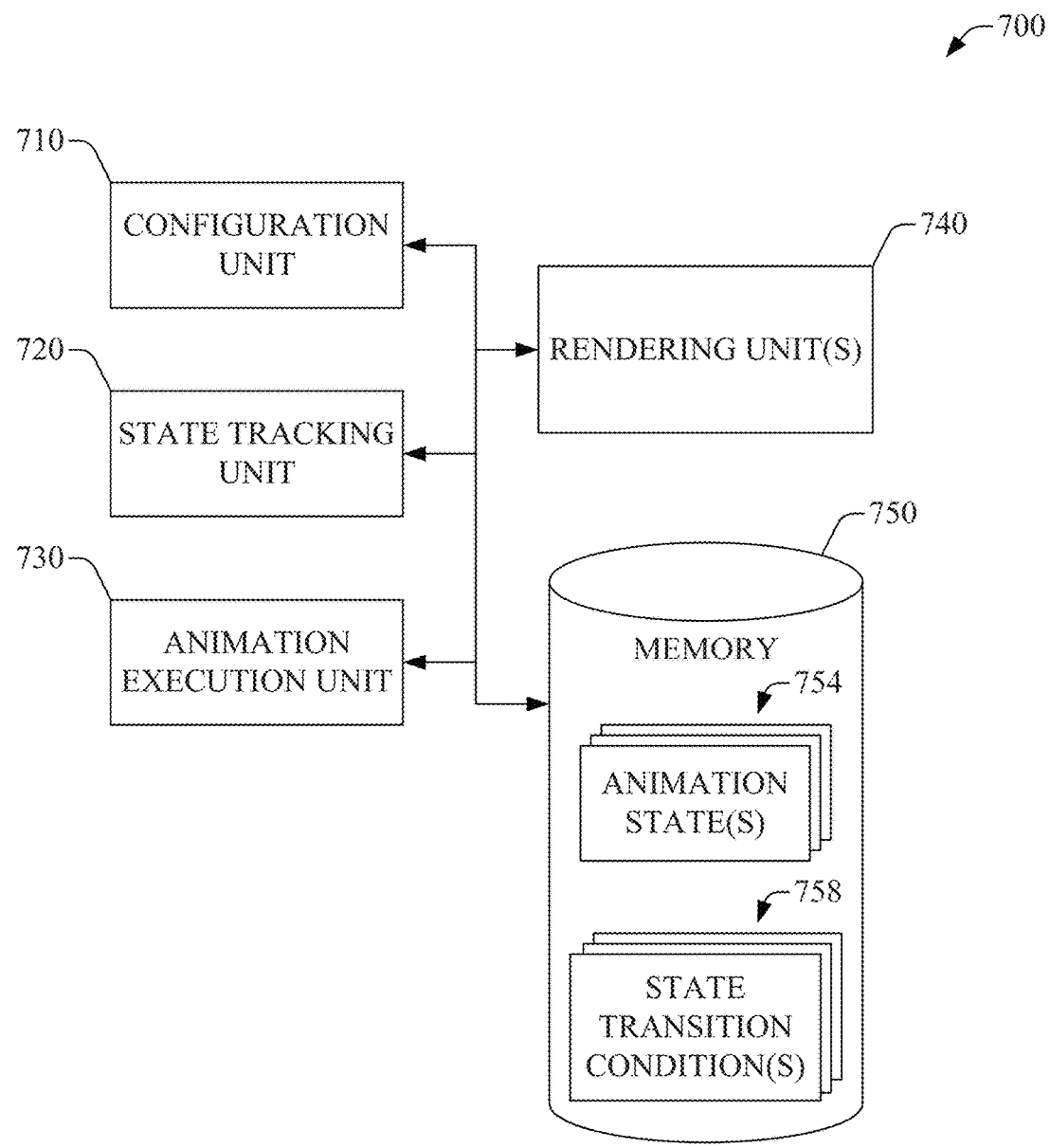
FIGS. 7-8 illustrate example operational environments in accordance with one or more aspects of the disclosure.

Management of animation collisions in accordance with aspects of the disclosure may be implemented in various operational environments, such as computational devices, computational systems, or the like. Such environments may be configured as a network or can operate as stand-alone functional elements. FIG. 7 illustrates a block diagram of an example operational environment 700 for management of animation collisions in accordance with one or more aspects of the disclosure. The example operational environment 700 can embody or can comprise a state machine management platform or system (which also may be referred to as a state machine manager). In one example implementation, at least a portion of the operational environment 700 can be integrated into the user equipment (or any other computing device) that can renders animations that may collide into each other.

As illustrated, the operational environment 700 includes a configuration unit 710 that can configure a state machine for management of an animation collision. To at least such an end, in one aspect, the configuration unit 710 can generate animation information (data, metadata, and/or signaling) indicative of one or more groups of animation sequences, where each of such groups is respectively associated with an animation. For instance, the configuration unit 710 can generate animation information indicative of the four groups of animation sequences associated with animations $A_0$, $A_1$, $A_2$, and $A_3$, wherein the animation information can include animation data (e.g., data on objects to be animated), animation metadata (e.g., data on function call(s) that may initiate an animation), and/or animation signaling (e.g., function calls that can initiate an animation). It should be appreciated that such animation information can include information indicative or otherwise representative of states associated with at least one (one, two, more than two, each) of the animation sequences of the group of one or more animation sequences. The configuration unit 710 can retain at least the portion of the animation information in one or more memory elements 754 (referred to as animation state(s) 754) in one or more memory devices 750 (represented as memory 750). In another aspect, the configuration unit 710 can generate transition information indicative of one or more state transition conditions and/or related transition between animation states. The configuration unit 710 can retain at least a portion of the transition information in one or more memory element 758 (referred to as state transition condition(s) 758) in the memory 750.

In certain scenarios, the configuration unit 710 can configure a state machine by receiving animation information and/or state transition information, and retaining at least a portion of the received information into the memory 750.

Configuration of a state machine for management of animation collisions may be referred to as acquisition of the state machine. It should be appreciated that regardless of the mechanism for acquisition of animation information and state transition information, such information can permit the state machine manager (e.g., via the configuration unit 710) to generate or otherwise access a logic representation of the state machine (e.g., a state diagram, a state transition table, or the like). As described herein, in one aspect, such acquisition can permit a state machine manager to track a current state of the state machine; to execute an animation associated with the current state; and to manage transitions from a current state to another state based at least on state transition conditions and definitions of state transitions. In the illustrated operational environment 700, a state tracking unit 720 can identify a state of the state machine (e.g., state IV) and the animation associated with the state (e.g., menu fades in). In addition or in the alternative, the state tracking unit 720 can collect or otherwise received information associated with the state and/or with information input into the state, such as information indicative of initiation of another animation (e.g., animation C 130). Based at least on a portion of such information, the state tracking unit 720 can evaluate a condition of the state transition condition(s) and based on an outcome (e.g., output information) of such evaluation, the state tracking can transition a current state (e.g, state VI in FIG. 6) of the state machine to a target state (e.g., state VIII in FIG. 6). In addition, the operational environment 700 can include an examination execution unit 730 that can implement an animation associated with a state of the state machine. Accordingly, in one aspect, the animation execution unit 730 can permit a state machine manager including such a unit to implement an animation associated with a specific state. In certain embodiments, implementation of an animation can include (i) generation or otherwise issuance of a function call to initiate the animation at a UI element, such as a logic instance of a rendering unit that is instantiated in memory; and (ii) execution of the function call, which can cause the rendering unit to render the animation. In the illustrated operational environment 700, the rendering unit may be included in the set of one or more rendering units 740.

The operational environment 800 also can comprise one or more rendering units 740. In one aspect, at least one of the rendering unit(s) 740 can include a display device (or display) that contains a display surface. The rendering unit(s) 740 can render at least a portion of an animation.

As illustrated, the operational environment 800 includes a memory device 750 (also referred to as memory 750) that can comprise information associated with management of animation collisions as described herein. The memory 750 can include one or more state machines and related animation states and transition rules. In addition, or in the alternative, the memory 750 can include programming logic (e.g., instructions) that, in response to execution, permits determination of a location of a point of contact (e.g., a pressure point) in relation to one or more other points of contact.

Figure 8:
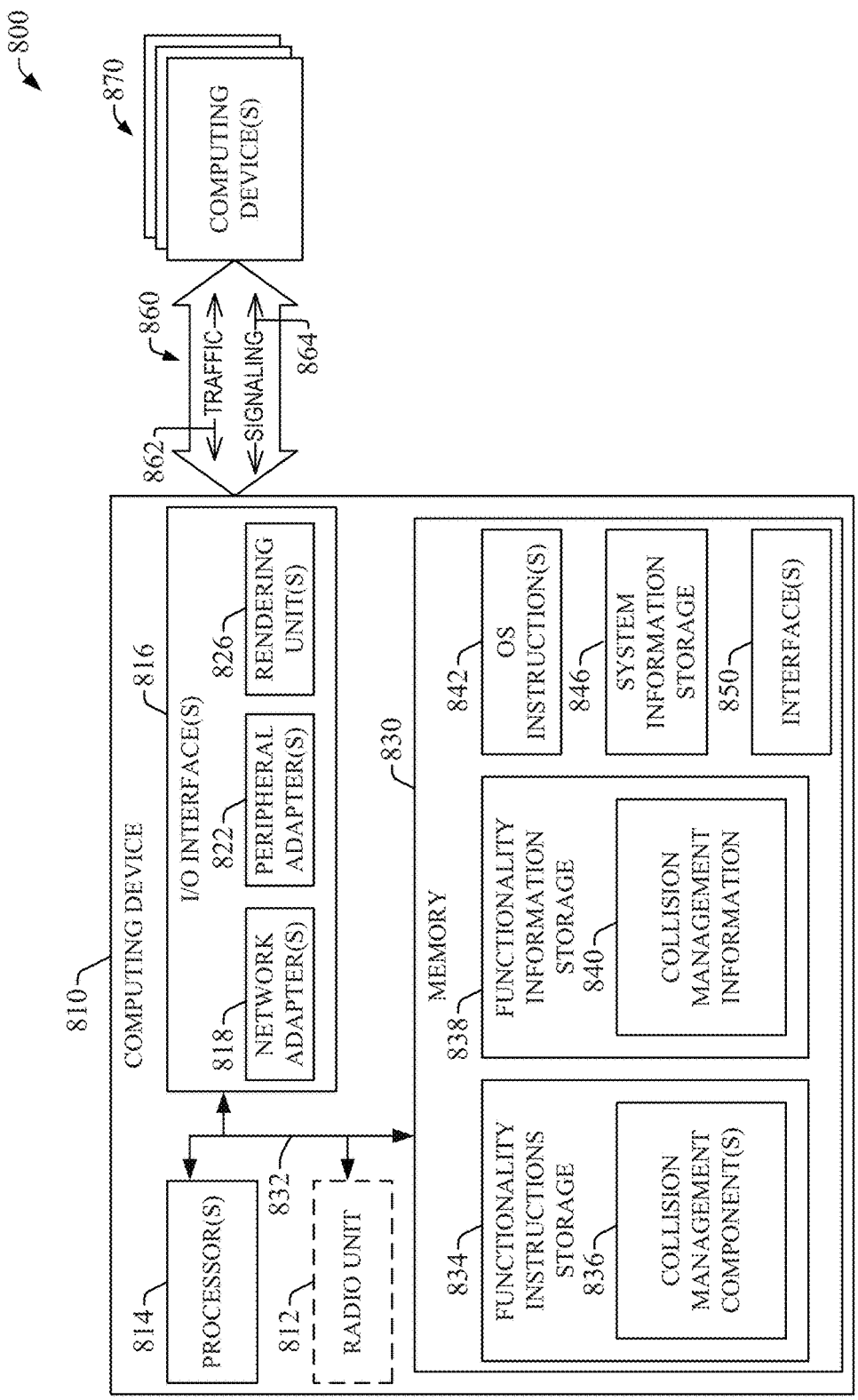

FIG. 8 illustrates a block diagram of an example operational environment 800 for management of an animation collision in accordance with one or more aspects of the disclosure. The example operational environment is merely illustrative and is not intended to suggest or otherwise convey any limitation as to the scope of use or functionality of the operating environment's architecture. In addition, the illustrative operational environment 800 depicted in FIG. 8 should not be interpreted as having any dependency or requirement relating to any one or combination of components illustrated as part of the operational environment 800. The operational environment 800 comprises a computing device 810 which, in various embodiments, can correspond to the computing device (e.g, user equipment) that renders animation and includes at least a portion of state machine management platform described in connection with FIG. 7.

The operational environment 800 represents an example implementation of the various aspects or features of the disclosure in which the processing or execution of operations described in connection with the management of animation collisions that is disclosed herein can be performed in response to execution of one or more software components at the computing device 810. It should be appreciated that the one or more software components can render the computing device 810, or any other computing device that contains such components, a particular machine for management of animation collisions as described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods described herein, such as the example method presented in FIGS. 9-10. For instance, to embody one such method, at least a portion of the computer-accessible instructions can be persisted (e.g., stored, made available, or stored and made available) in a computer storage non-transitory medium and executed by a processor. The one or more computer-accessible instructions that embody a software component can be assembled into one or more program modules that can be compiled, linked, and/or executed at the computing device 810 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 810 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the management of animation collisions described herein can comprise personal computers; server computers; laptop devices; handheld computing devices, such as mobile tablets; wearable computing devices; and multiprocessor systems. Additional examples can include set-top boxes, programmable consumer electronics, network PCs, minicomputers, mainframe computers, blade computers, programmable logic controllers (PLCs), distributed computing environments that comprise any of the above systems or devices, or the like.

As illustrated, the computing device 810 can comprise one or more processors 814, one or more input/output (I/O) interfaces 816, one or more memory devices 830 (herein referred to generically as memory 830), and a bus architecture 832 (also termed bus 832) that functionally couples various functional elements of the computing device 810. In certain embodiments, the computing device 810 can include, optionally, a radio unit 812 (also termed radio 812). The radio unit 812 can include one or more antennas and a communication processing unit that can permit wireless communication between the computing device 810 and another device, such as one of the computing device(s) 870. The bus 832 can include at least one of a system bus, a memory bus, an address bus, or a message bus, and can permit exchange of information (data, metadata, and/or signaling) between the processor(s) 814, the I/O interface(s) 816, and/or the memory 830, or respective functional elements therein. In certain scenarios, the bus 832 in conjunction with one or more internal programming interfaces 850 (also referred to as interface(s) 850) can permit such exchange of information. In scenarios in which the processor(s) 814 include multiple processors, the computing device 810 can utilize parallel computing.

One or more of the I/O interface(s) 816 can permit communication of information between the computing device and an external device, such as another computing device (e.g., a network element or an end-user device). Such communication can include direct communication or indirect communication, such as exchange of information between the computing device 510 and the external device via a network or elements thereof. In addition, as described herein, a group of the I/O interface(s) 816 also can permit conveying information (e.g., data, metadata, and/or signaling) to an end-user that may operate the computing device 810. As illustrated, the I/O interface(s) 816 can comprise one or more of network adapter(s) 818, peripheral adapter(s) 822, and rendering unit(s) 826. Such adapter(s) can permit or otherwise facilitate connectivity between the external device and one or more of the processor(s) 814 or the memory 830. For example, the peripheral adapter(s) 522 can include a group of ports, which can comprise at least one of parallel ports, serial ports, Ethernet ports, V.35 ports, or X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394.

In one aspect, at least one of the network adapter(s) 818 can functionally couple the computing device 810 to one or more computing devices 870 via one or more traffic and signaling pipes 860 that can permit or otherwise facilitate exchange of traffic 862 and signaling 864 between the computing device 810 and the one or more computing devices 870. Such network coupling provided at least in part by the at least one of the network adapter(s) 818 can be implemented in a wired environment, a wireless environment, or a combination of both. It should be appreciated that the information that is communicated by the at least one of the network adapter(s) 818 can result from implementation of one or more operations in a method for management of animation collisions in accordance with aspects of the disclosure. Such output can include information indicative or otherwise representative of animations and/or any form of visual representation, including textual, graphical, aural, tactile, combinations thereof or the like. In certain scenarios, each of the computing device(s) 870 can have substantially the same architecture as the computing device 810. In addition, or in the alternative, the rendering unit(s) 826 can include functional elements (e.g., lights, such as light-emitting diodes; a display, such as liquid crystal display (LCD), a plasma monitor, a light emitting diode (LED) monitor, an electrochromic monitor; combinations thereof; or the like) that can permit control of the operation of the computing device 810, or can permit conveying or revealing the operational conditions of the computing device 810.

In one aspect, the bus 832 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, a Universal Serial Bus (USB) and the like. The bus 832, and all buses described herein can be implemented over a wired or wireless network connection and each of the subsystems, including the processor(s) 814, the memory 830 and memory elements therein, and the I/O interface(s) 816 can be contained within one or more remote computing devices 870 at physically separate locations, connected through buses of this form, thereby effectively implementing a fully distributed system.

The computing device 810 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 810, and can comprise, for example, both volatile and non-volatile media, and removable and/or non-removable media. In one aspect, the memory 830 can comprise computer-readable media in the form of volatile memory, such as random access memory (RAM), and/or non-volatile memory, such as read-only memory (ROM).

The memory 830 can comprise functionality instructions storage 834 and functionality information storage 838. The functionality instructions storage 834 can comprise computer-accessible instructions that, in response to execution by at least one of the processor(s) 814, can implement one or more of the functionalities of the disclosure. The computer-accessible instructions can embody or can comprise one or more software components illustrated as collision management component(s) 836. In one scenario, execution of at least one component of the collision management component(s) 836 can implement one or more of the methods described herein in connection with management of animation collisions, such as example method 900 and/or 1000, or the example state diagram 600. For instance, such execution can cause a processor that executes the at least one component to carry out, at least in part, a disclosed example method. It should be appreciated that, in one aspect, a processor of the processor(s) 814 that executes at least one of the collision management component(s) 836 can retrieve information from or retain information in a memory element 840 in the functionality information storage 838 in order to operate in accordance with the functionality programmed or otherwise configured by the collision management component(s) 836. Such information can include at least one of code instructions, information structures, or the like. At least one of the one or more interfaces 850 (e.g., application programming interface(s)) can permit or facilitate communication of information between two or more components within the functionality instructions storage 834. The information that is communicated by the at least one interface can result from implementation of one or more operations in a method for management of animation collisions in accordance with aspects of the disclosure. In certain embodiments, one or more of the functionality instructions storage 834 and the functionality information storage 838 can be embodied in or can comprise removable/non-removable, and/or volatile/non-volatile computer storage media.

At least a portion of one or more of the animation collision management component(s) 836 (also termed collision management component(s) 836) or collision management information 840 can program or otherwise configure at least one of the processor(s) 814 to operate at least in accordance with the functionality described herein. In one embodiment, the collision management component(s) 836 contained in the functionality instruction(s) storage 834 can include the configuration unit 710, the state tracking unit 720, and/or the animation execution unit 730. It should be recognized that in such an embodiment, hardware or firmware functional elements of the configuration unit 710, the state tracking unit 720, the animation execution unit 730, and/or the rendering unit(s) 720 can be embodied in suitable components of the computing device 510. For instance, at least one of the processors 814 and at least one of the I/O interface(s) 816 (e.g., one of the rendering unit(s) 826) can embody a rendering unit of the rendering unit(s) 720. In operation, for example, one or more of the processor(s) 814 can execute at least one of the collision management component(s) 836 and leverage or otherwise utilize at least a portion of the information in the functionality information storage 838 in order to provide management of animation collisions in accordance with one or more aspects described herein. In one example scenario, the at least one of the processor(s) 814 can execute at least a portion of the animation execution component 730 that is retained in the storage 834 and, in response, can cause such a rendering unit to render animations in accordance with aspects of the disclosure.

It should be appreciated that, in certain scenarios, the functionality instruction(s) storage 834 can embody or can comprise a computer-readable non-transitory storage medium having computer-accessible instructions that, in response to execution, cause at least one processor (e.g., one or more of processor(s) 814) to perform a group of operations comprising the operations and/or blocks described in connection with the disclosed methods for management of animation collisions.

In addition, the memory 830 can comprise computer-accessible instructions and information (e.g., data and/or metadata) that permit or facilitate operation and/or administration (e.g., upgrades, software installation, any other configuration, or the like) of the computing device 810. Accordingly, as illustrated, the memory 830 can comprise a memory element 842 (labeled operating system (OS) instruction(s) 842) that can contain one or more program modules that embody or include one or more operating systems, such as a Windows operating system, Unix, Linux, Symbian, Android, Chromium, or substantially any OS suitable for mobile computing devices or tethered computing devices. In one aspect, the operational and/or architectural complexity of the computing device 810 can dictate a suitable OS. The memory 830 also comprises a system information storage 846 having data and/or metadata that permits or facilitates operation and/or administration of the computing device 810. Elements of the OS instruction(s) 842 and the system information storage 846 can be accessible or can be operated on by at least one of the processor(s) 814.

It should be recognized that while the functionality instructions storage 834 and other executable program components, such as the OS instruction(s) 842, are illustrated herein as discrete blocks, such software components can reside at various times in different memory components of the computing device 810, and can be executed by at least one of the processor(s) 814. In certain scenarios, an implementation of the layout configuration component(s) 836 can be retained on or transmitted across some form of computer-readable media.

The computing device 810 and/or one of the computing device(s) 870 can include a power supply (not shown), which can power up components or functional elements within such devices. The power supply can be a rechargeable power supply, e.g., a rechargeable battery, and it can include one or more transformers to achieve a power level suitable for operation of the computing device 810 and/or one of the computing device(s) 870, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 818) to connect operationally to the conventional power grid. In another aspect, the power supply can include an energy conversion component, such as a solar panel, to provide additional or alternative power resources or autonomy for the computing device 810 and/or at least one of the computing device(s) 870.

The computing device 810 can operate in a networked environment by utilizing connections to one or more remote computing devices 870. As an illustration, a remote computing device can be a personal computer, a portable computer, a server, a router, a network computer, a peer device or other common network node, and so on. As described herein, connections (physical and/or logical) between the computing device 810 and a computing device of the one or more remote computing devices 870 can be made via one or more traffic and signaling pipes 860, which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 870) that are functionally coupled (e.g., communicatively linked or otherwise coupled) through a network having traffic and signaling pipes and related network elements. In a distributed computing environment, in one aspect, one or more software components (such as program modules) can be located in both a local computing device 810 and at least one remote computing device.

Figure 9:
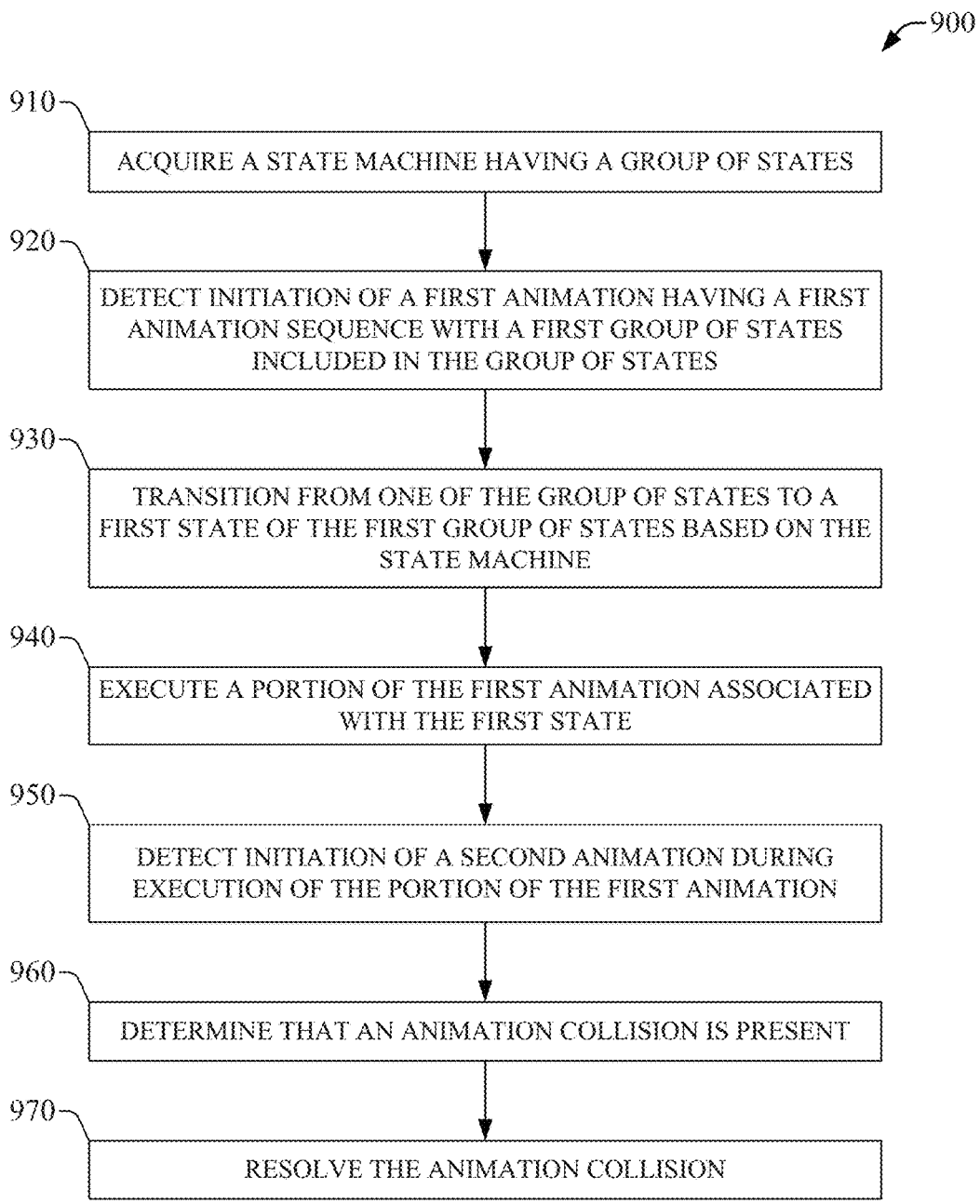
FIGS. 9-10 illustrate example methods in accordance with the one or more aspects of the disclosure.

In view of the aspects described herein, an example method that can be implemented in accordance with the disclosure can be better appreciated with reference to the flowchart in FIG. 9. For purposes of simplicity of explanation, the example method disclosed herein is presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that are shown and described herein. For example, the various methods or processes of the disclosure can be alternatively represented as a series of interrelated states or events, such as in a state diagram (e.g., FIG. 4B or 6). Furthermore, not all illustrated blocks, and associated actions, may be required to implement a method in accordance with one or more aspects of the disclosure. Further yet, two or more of the disclosed methods or processes can be implemented in combination with each other in order to accomplish one or more features or advantages described herein.

It should be appreciated that the methods of the disclosure can be retained on an article of manufacture, or computer-readable medium, to permit or facilitate transporting and transferring such methods to a computing device (e.g., a desktop computer; a mobile computer, such as a tablet, or a smartphone or other mobile telephone; a gaming console; a blade computer; a programmable logic controller; and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

FIG. 9 presents a flowchart of an example method 900 for managing an animation collision according to at least certain aspects of the disclosure. One or more computing devices having one or more processors or being functionally coupled to at least one processor can implement (e.g., compile, execute, compile and execute, etc.) one or more blocks of the example method 700. In one embodiment, for example, the computing device 810 can implement the subject example method 900. In other scenarios, one or more blocks of the subject example method can be implemented in a distributed fashion by two or more computing devices contained in a system. Each of the two or more computing devices can have at least one processor or can be functionally coupled to at least one processor, where such processor(s) can implement at least one of the one or more blocks.

At block 910, a state machine having a group of states is acquired. In certain embodiments, the group of state can include a plurality of states and, as described herein, each of state in the plurality of states may be associated with a portion of an animation (e.g., selection of a menu of ebooks). Such a portion may be referred to as a state animation. The plurality of states can include two groups (or sub-groups) of states, each of such groups corresponding to respective animations (e.g., animation A 110 and animation C 130). In certain implementations, the state machine (such as the state machine associated with the state diagram 600) can be acquired by generating information indicative of the group of states and/or associated state transitions. In other implementations, the state machine can be acquired by receiving the information indicative of the group of states and/or the associated state transitions. In certain embodiments, the configuration unit 710 can configure the state machine. The configuration unit 710 can be integrated into or otherwise functionally coupled to the computing device that implements the subject example method.

At block 920, initiation of a first animation is detected. The first animation (e.g., Animation A 110) can have a first animation sequence (e.g., $S_1^{(A)}$, $S_2^{(A)}$, . . . , and $S_N^{(A)}$) comprising a first group of states included in the group of states associated with the state machine that is configured at block 910. Each of the first group of states may be associated with a portion of the first animation and, as described herein, such portion may be referred to as a state animation. Block 910 can be referred to as a detecting operation and, in one aspect, it can comprise receiving information (data, metadata, and/or signaling) indicative of initiation of the first animation. At least a portion of such information can be embodied in or can include a function call directed to a user interface integrated into or functionally coupled to the computing device that implements the subject example method. In certain embodiments, the state tracking unit 720 can detect the first animation by receiving the information indicative of initiation of the first animation. The state tracking unit 720 or any other unit(s) that can detect the first animation can be integrated into or otherwise functionally coupled to the computing device that implements the subject example method.

At block 930, a transition from one of the group of states to a first state of the first group of states is performed based on the state machine that is configured at block 910. In one embodiment, the state tracking unit 720 can perform such a transition. As described herein, the first state (which may be referred to herein as "current state" or "current first state") can be associated with a portion of the first animation and at block 940, the portion of the first animation can be executed. In certain embodiments, the animation execution unit 730 can detect the first animation by receiving the information indicative of initiation of the first animation. The animation execution unit 730 or any other unit(s) that can detect the first animation can be integrated into or otherwise functionally coupled to the computing device that implements the subject example method.

At block 950, initiation of a second animation during execution of the portion of the first animation is detected. As described herein, in one aspect, the portion of the first animation can be associated with a state animation corresponding to the first state. The second animation can be associated with a second group of states associated with the state machine. In one example scenario, as described herein in connection with FIG. 2B, Animation C 130 can be initiated at an instant $t_C$ during execution of the state animation associated with the state $S_K^{(A)}$ in the animation A 110. Such state animation being, for example, a portion of the animation A 110. The user interface that is integrated into or otherwise functionally coupled to the computing device that implements the subject example method can render or otherwise convey the animation associated with the current first state. Similar to block 920, block 950 also can be referred to as a detecting operation and, in one aspect, it can include receiving information (data, metadata, and/or signaling) indicative of initiation of the second animation. At least a portion of such information can be embodied in or can include a function call directed to the user interface that renders the animation associated with the current first state. At block 960, it is determined that an animation collision is present. Such a determination can be performed in response to detection of the second animation. In one embodiment, the state tracking unit 720 can determine that the animation collision is present.

At block 970, the animation collision is resolved. In certain implementations, the animation collision is resolved based at least in part on or otherwise using the first state, the first group of states, and/or the second group of states. Block 970 can be referred to as a resolving operation and, in one aspect, it can comprise traversing one or more states of a state machine. Traversing the one or more states may include executing one of such state(s) and/or transitioning to another of such state(s). In another aspect, the resolving can include at least one of (a) fading out the animation associated with the first state and fading in the second animation, or (b) queuing the second animation for a specified period. It should be appreciated that fading out the animation associated with the first state may constitute fading out the first animation. In one aspect, the specific period can be configured to span an interval that permits (A) at least completing or terminating execution of the animation associated with the first state, (B) transitioning from the first state to a control state of the state machine, and/or (C) executing another animation associated with the control state. It also should be appreciated that completing or terminating execution of the animation associated with the current first state may constitute completing or terminating the first animation.

Figure 10:
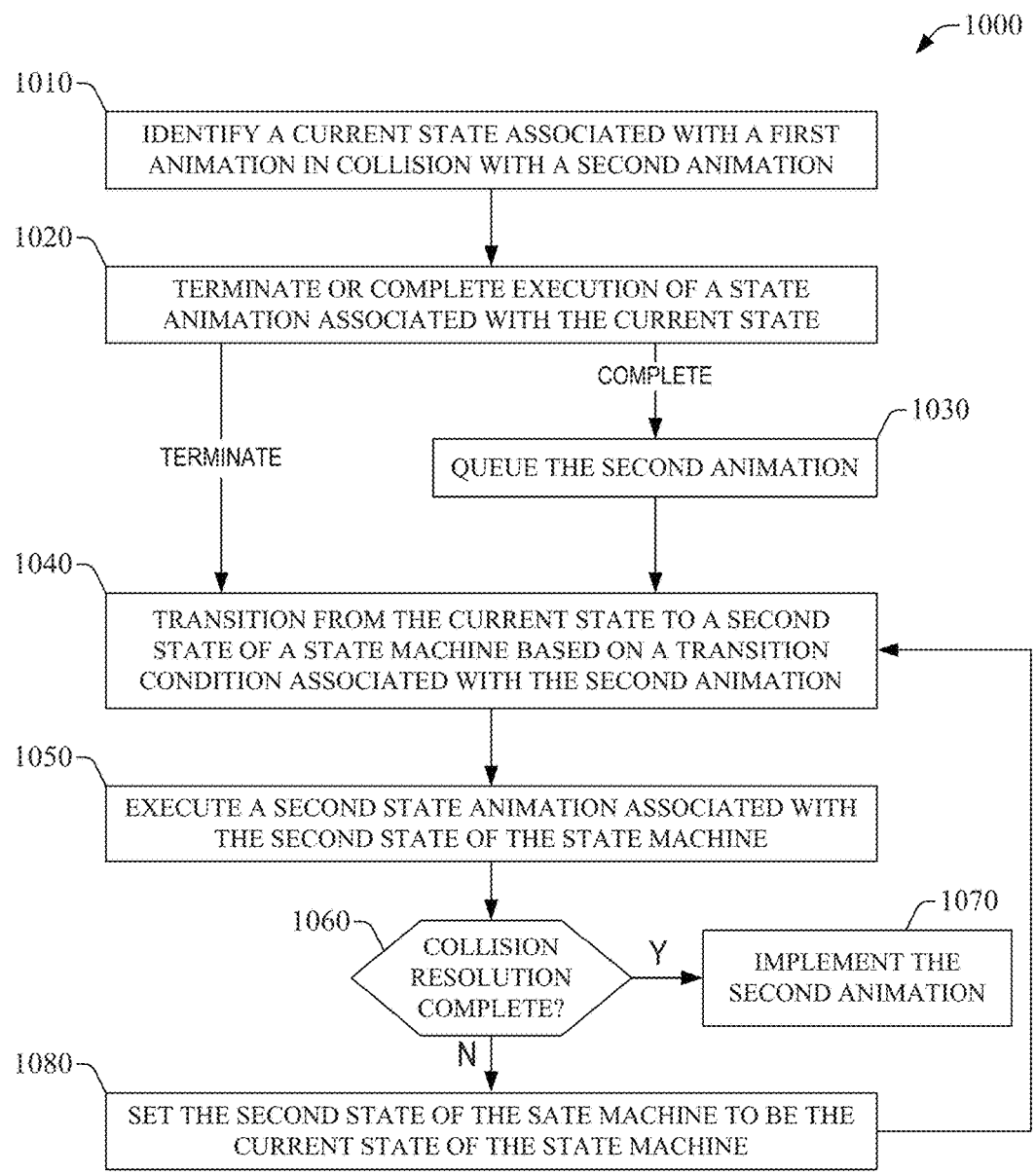

FIG. 10 presents a flowchart of an example method 1000 for resolving an animation collision according to at least certain aspects of the disclosure. The subject example method can embody or can constitute block 970 in example method 900. A computing device that implements the example method 900 also can implement (e.g., compile, execute, compile and execute, etc.) the example method 1000. At block 1010, a current state (e.g., state IV in FIG. 4B) associated with a first animation (e.g., an Add animation) in collision with a second animation (e.g., a Set animation) can be identified. At block 1020, execution of a state animation associated with the current state is terminated or completed. It should be appreciated that the state animation, in one aspect, corresponds or is otherwise associated with a portion of the first animation. Such portion corresponding to or otherwise being associated with the current state associated with the first animation. In one example embodiment, as described herein, the state animation can be embodied in or can include a menu fade in, wherein the menu presents a group of categories associated with one or more content assets. In response to (e.g., upon or after) termination of execution of the current state, a transition from the so terminated current state to a second state of a state machine (such as the state machine represented by the state diagram in FIG. 6) is effected at block 1040. Such a transition is based at least in part on a transition condition associated with the second animation. In addition or in the alternative, in response to (e.g., upon, during, or after) completion of execution of such a state animation, the second animation is queued at block 1030 and the flow is directed to block 1040. At block 1050, a second state animation associated with the second state (e.g., state II in FIG. 3B) of the state machine is executed. In certain embodiments, the second state animation can be a portion of the first animation. In other embodiments, the second state animation may be specific to the second state, which can be embodied in or can comprise a control state (e.g., state Σ or Σ' as described in connection with FIG. 4C). It should be appreciated that, in certain embodiments, the second state of the state machine at block 1040 can be specific to the flow branch that is implemented in the subject example method. Accordingly, in one aspect, a rendering associated with the second state animation attained via the "terminate" flow branch may be different from the rendering that result from execution of the second state animation when such animation is attained via the "complete" branch. In one example embodiment, the rendering associated with the second animation state that is obtained via the "terminate" branch may present content that is parametrically faded out as described herein. At block 1060, it is determined if collision resolution is complete. In response to ascertaining that collision resolution is complete, the second animation is implemented at block 1070. In the alternative, in response to ascertaining that collision resolution is not complete, the second state of the state machine is set to be the current state of the state machine at block 1080, and flow is directed to block 1040. In another example embodiment, the rendering associated with the second animation state that is obtained via the "terminate" branch after the flow of the subject example method is returned to block 1040 subsequently to implementation of the update block 1070 may present content that is parametrically faded in as described herein. Accordingly, in at least certain aspects, implementation of the "terminate" branch of the example method 1000 can result in a fade-out-fade-in approach to resolution of an animation collision.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read only memory (ROM); random access memory (RAM); magnetic disk storage media; optical storage media; flash memory, etc.

Embodiments of the operational environments and methods (or techniques) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into onto a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "module," "pipe," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that provides, at least in part, the functionality of the electronic components. An interface can include input/output (I/O) components as well as associated processor, application, and/or other programming components. The terms "component," "environment," "system," "architecture," "interface," "unit," "module," and "pipe" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance the performance of user equipment or other electronic equipment.

In addition, in the present specification and annexed drawings, terms such as "store," storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that can provide management of animation collisions. It is, of course, not possible to describe every conceivable combination of elements and/or methods for purposes of describing the various features of the disclosure, but it can be recognize that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method of management of animation collisions, comprising:
    acquiring, by a computing device having at least one processor, a state machine having a plurality of states;
    detecting, by the computing device, initiation of a first animation associated with a first group of states included in the plurality of states, the first animation to be applied to a user-interface element;
    transitioning, by the computing device, to a first state of the first group of states according to the state machine;
    executing, by the computing device, a portion of the first animation associated with the first state;
    receiving, by the computing device, information that initiates a second animation to be applied to the user-interface element during execution of the portion of the first animation associated with the first state, wherein the second animation is associated with a second group of states included in the plurality of states;
    determining, by the computing device, that an animation collision based at least in part on the first animation and the second animation is present; and
    resolving, by the computing device, the animation collision using the first state, the first group of states, and the second group of states, the resolving including:
        queuing the second animation for a specified period;
        transitioning from the first state to a first control state of the state machine;
        executing a third animation associated with the first control state during the specified period;
        transitioning from the first control state to a second control state of the state machine; and executing a fourth animation associated with the second control state during the specified period.

2. The method of claim 1, wherein the resolving comprises parametrically fading out the first animation and parametrically fading in the second animation, and wherein the parametrically fading in comprises identifying a second state of the second group of states, and
executing a fifth animation associated with the second state.

3. The method of claim 1, wherein the first animation and the second animation are to be applied to animation of a first indicia, or the first animation is to be applied to animation of the first indicia and the second animation is to be applied to animation of a second indicia.

4. A method, comprising:
detecting, by a computing device having at least one processor, initiation of a first animation associated with a first group of states, the first animation to be applied to a user-interface element;
executing, by the computing device, a portion of the first animation, wherein the portion of the first animation corresponds to a first state of the first group of states;
receiving information that initiates a second animation to be applied to the user-interface element during execution of the first animation, wherein the second animation is associated with a second group of states;
determining, by the computing device, that an animation collision based at least in part on the first animation and the second animation is present;
transitioning to a first control state of the state machine; and
executing a third animation associated with the first control state.

5. The method of claim 4, further comprising at least one of (a) fading out the first animation and fading in the second animation, or (b) queuing the second animation for a specified period, wherein the third animation is executed during the specified period.

6. The method of claim 5, wherein the specified period is configured for at least completing or terminating execution of an animation associated with the first state.

7. The method of claim 6, wherein resolving the animation collision includes transitioning the state machine from the first state to a second state of the state machine based at least in part on the second animation.

8. The method of claim 7, wherein resolving the animation collision includes transitioning the state machine from the first state to a third state of the state machine based on a triggering condition associated with the second animation.

9. The method of claim 5, wherein the fading in comprises identifying a second state of the second group of states, and
executing an animation associated with the initial second state.

10. A computing device, comprising:
at least one memory device having instructions encoded thereon; and
at least one processor functionally coupled to the one or more memory devices and configured, by the instructions,
to detect initiation of a first animation associated with a first group of states, the first animation to be applied to a user-interface element;
to execute a portion of the first animation, wherein the portion of the first animation corresponds to a first state of the first group of states;
to receive information that initiates a second animation to be applied to the user-interface element during execution of the first animation, wherein the second animation is associated with a second group of states;
to determine that an animation collision based at least in part on the first animation and the second animation is present;
to transition to a first control state of the state machine; and
to execute a third animation associated with the first control state,
wherein the at least one processor is further configured to execute states of a state machine comprising the first group of states and the second group of states, and wherein the at least one processor is still further configured to cause a transition from a first defined state of the states to a second defined state of the states.

11. The computing device of claim 10, wherein the at least one processor is further configured (a) to fade out the first animation and fade in the second animation, or (b) to queue the second animation for a specified period, wherein the third animation is executed during the specified period.

12. The computing device of claim 11, wherein the specified period is configured for at least the processor to complete or terminate execution of an animation associated with the first state.

13. The computing device of claim 12, wherein the first defined state is the first state and the second defined state is a second state of the state machine, and wherein to resolve the animation collision, the at least one processor is further configured to transition the state machine from the first state to the second state based at least in part on the second animation.

14. The computing device of claim 13, wherein to resolve the animation collision, the at least one processor is further configured to transition the state machine from the first state to a third state of the state machine based on a triggering condition associated with the second animation.

15. At least one computer-readable non-transitory storage medium having computer-executable instructions encoded thereon that, in response to execution, cause at least one processor to perform operations comprising:
detecting initiation of a first animation associated with a first group of states, the first animation to be applied to a user-interface element;
executing a portion of the first animation, wherein the portion of the first animation corresponds to a first state of the first group of states;
receiving information that initiates a second animation to be applied to the user-interface element during execution of the first animation, wherein the second animation is associated with a second group of states;
determining that an animation collision is present based at least in part on the first animation and the second animation;
transitioning to a first control state of the state machine; and
executing a third animation associated with the first control state.

16. The at least one computer-readable non-transitory storage medium of claim 15, wherein resolving the animation collision further comprises at least one of (a) fading out the first animation and fading in the second animation, or (b) queuing the second animation for a specified period, wherein the third animation is executed during the specified period.

17. The at least one computer-readable non-transitory storage medium of claim 16, wherein the specified period is configured for at least completing or terminating execution of an animation associated with the first state.

18. The at least one computer-readable non-transitory storage medium of claim 17, wherein resolving the animation collision includes transitioning the state machine from the first state to a second state of the state machine based at least in part on the second animation.

19. The at least one computer-readable non-transitory storage medium of claim 18, wherein resolving the animation collision further includes transitioning the state machine from the first state to a third state of the state machine based on a triggering condition associated with the second animation.

* * * * *